US008099322B2

(12) United States Patent
Watanabe et al.

(10) Patent No.: US 8,099,322 B2
(45) Date of Patent: Jan. 17, 2012

(54) TIME FACTOR FEATURE GENERATION SYSTEM, TIME FACTOR FEATURE GENERATION METHOD AND TIME FACTOR FEATURE GENERATION PROGRAM

(75) Inventors: Satoru Watanabe, Kawasaki (JP); Youji Kohda, Kawasaki (JP); Masatomo Yasaki, Kawasaki (JP); Yasuhide Matsumoto, Kawasaki (JP); Masashi Uyama, Kawasaki (JP); Mitsuru Oda, Kawasaki (JP); Hiroki Ichiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 968 days.

(21) Appl. No.: 11/873,848

(22) Filed: Oct. 17, 2007

(65) Prior Publication Data

US 2008/0103853 A1 May 1, 2008

(30) Foreign Application Priority Data

Oct. 17, 2006 (JP) .................................. 2006-282896

(51) Int. Cl.
*G06Q 99/00* (2006.01)
(52) U.S. Cl. ................. 705/14.4; 705/14.41; 705/14.49; 705/14.68; 705/14.73; 705/26.1
(58) Field of Classification Search ............. 705/1, 14.4, 705/14.41, 14.49, 14.68, 14.73, 26
See application file for complete search history.

(56) References Cited

U.S. PATENT DOCUMENTS 6,334,110 B1 * 12/2001 Walter et al. ............... 705/14.41
2001/0056369 A1 * 12/2001 Takayama et al. .............. 705/14

FOREIGN PATENT DOCUMENTS

JP 2000-285175 A 10/2000
(Continued)

OTHER PUBLICATIONS

Masatoshi Kumagai et al.; "Development of Long-term Travel Time Forecast Method for Nationwide Traffic Information Services"; Journal of Information Processing Society of Japan, vol. 45, 12th Issue, pp. 1-9.

(Continued)

*Primary Examiner* — Akiba Robinson Boyce
(74) *Attorney, Agent, or Firm* — Westerman, Hattori, Daniels & Adrian, LLP

(57) ABSTRACT

A time factor feature generation system includes: a use status grasping portion that extracts transition data showing variations in degree of use of a site from log data; a variation data generating portion that generates, based on the transition data, variation data expressing the variations in degree of use of the site as a group Y of values showing the degree of use of the site; a time factor data recording portion in which a plurality of time factors and time factor values of each of the plurality of time factors are recorded; a time factor extracting portion that generates groups $D_i$ of time factor values, each of which corresponds to a time factor extracted from among the plurality of time factors; and a time factor feature generating portion 13 that calculates coefficients $a_i$ such that a square of an error b has a minimum value in an equation in which the groups $D_i$ and the group Y are used as an explaining variable and an explained variable, respectively, thereby to generate data showing a time factor feature of a use status of the site. By this configuration, the time factor feature generation system generates data quantitatively showing a time factor feature of a use status of a site.

14 Claims, 24 Drawing Sheets

FOREIGN PATENT DOCUMENTS

| | | |
|---|---|---|
| JP | 2001-245432 A | 9/2001 |
| JP | 2002-74197 A | 3/2002 |

OTHER PUBLICATIONS

Masatoshi Kumagai et al; "Development of Long-term Travel Time Forecast Method for Nationwide Traffic Information Services"; Dec. 2004, vol. 45, No. 12, pp. 2696-2705.

Komatsubara, Ken; "Profiling Web User, Analysis and estimation of the age, preference, etc. of the user from the access history", Nikkei Internet Technology, 1998, pp. 1-3(cited in Japanese Office Action dated Aug. 18, 2011).

Watanabe, Satoru et al.; "Day-factor Analysis of User behaviors in E-Commerce: Using Principal Components Regression"; Proc. of Multimedia, Distributed, Cooperative, and Mobile (DICOMO) Symposium, Jul. 2006(cited in Japanese Office Action dated Aug. 18, 2011).

Japanese Office Action dated Aug. 18, 2011, issued in corresponding Japanese Patent Application No. 2006-282896.

* cited by examiner

|  | 0:00 | 0:10 | 0:20 | . . . | 23:50 |
|---|---|---|---|---|---|
| 2006/01/01 | 24 | 34 | 34 | . . . | 33 |
| 2006/01/02 | 21 | 26 | 52 | . . . | 14 |
| 2006/01/03 | 25 | 17 | 45 | . . . | 25 |
| 2006/01/04 | 21 | 16 | 31 | . . . | 21 |
| ... | ... | ... | ... | ... | ... |
| 2006/12/31 | 20 | 27 | 36 | . . . | 26 |

N days (rows), M (columns)

FIG. 2A

|  | First principal component | Second principal component | . . . | pth principal component |
|---|---|---|---|---|
| 2006/01/01 | 85 | 42 | . . . | 53 |
| 2006/01/02 | 63 | 64 | . . . | 61 |
| 2006/01/03 | 92 | 74 | . . . | 25 |
| 2006/01/04 | 78 | 81 | . . . | 46 |
| ... | ... | ... | ... | ... |
| 2006/12/31 | 47 | 84 | . . . | 56 |

N days (rows), P (columns)

FIG. 2B

| | Monday | Tuesday | Wednesday | Public holiday /substitute public holiday | Beginning of a cold season | Day whose number is a multiple of 5 | January | ... |
|---|---|---|---|---|---|---|---|---|
| Jan. 1, 2006 | 0 | 0 | 0 | 1 | 0 | 0 | 1 | ... |
| Jan. 2, 2006 | 1 | 0 | 0 | 0 | 0 | 0 | 1 | ... |
| Jan. 3, 2006 | 0 | 1 | 0 | 0 | 0 | 0 | 1 | ... |
| Jan. 4, 2006 | 0 | 0 | 1 | 0 | 1 | 0 | 1 | ... |
| Jan. 5, 2006 | 0 | 0 | 0 | 0 | 0 | 1 | 1 | ... |
| Jan. 6, 2006 | 0 | 0 | 0 | 0 | 0 | 0 | 1 | ... |
| Jan. 7, 2006 | 0 | 0 | 0 | 0 | 0 | 0 | 1 | ... |
| Jan. 8, 2006 | 0 | 0 | 0 | 1 | 0 | 0 | 1 | ... |
| Jan. 9, 2006 | 1 | 0 | 0 | 0 | 0 | 0 | 1 | ... |
| Jan. 10, 2006 | 0 | 1 | 0 | 0 | 0 | 1 | 1 | ... |
| Jan. 11, 2006 | 0 | 0 | 1 | 0 | 0 | 0 | 1 | ... |
| Jan. 12, 2006 | 0 | 0 | 0 | 0 | 0 | 0 | 1 | ... |
| Jan. 13, 2006 | 0 | 0 | 0 | 0 | 0 | 0 | 1 | ... |
| Jan. 14, 2006 | 0 | 0 | 0 | 0 | 0 | 0 | 1 | ... |
| Jan. 15, 2006 | 0 | 0 | 0 | 0 | 0 | 1 | 1 | ... |
| ... | | | | | | ... | ... | ... |
| Dec. 31, 2006 | 0 | 0 | 0 | 0 | 0 | 0 | 0 | ... |

FIG. 3

| Service ID | Service location | URL | Action |
|---|---|---|---|
| s0001 | Mail-order site of Company A | http://www.site1/ad.html | Browse |
| | | http://www.site1/go.html | Input selected merchandise |
| | | http://www.site1/con.html | Press order button |
| S0002 | E-commerce site of Company B | http://www.site2/ad.html | Browse |
| | | http://www.site2/con.html | Press order button |
| ⋮ | ⋮ | ⋮ | ⋮ |

FIG. 6A

| Ad ID | Ad location | URL | Action |
|---|---|---|---|
| k0001 | Mail-order ad site of Company A | http://www.site1/home.html | Browse |
| k0002 | E-commerce ad site of Company B | http://www.site2/home.html | Browse |
| ⋮ | ⋮ | ⋮ | ⋮ |

FIG. 6B

|  | Behavior pattern ID=P-0001 | Behavior pattern ID=P-0002 | Behavior pattern ID=P-0003 | · |
|---|---|---|---|---|
| Browse at mail-order ad site of Company A | 1 | 1 | 1 | · |
| · | · | · | · | · |
| Press order button at mail-order site of Company A | 1 | 0 | 1 | · |
| · | · | · | · | · |
| Browse e-commerce site of Company B | 1 | 0 | 0 | · |

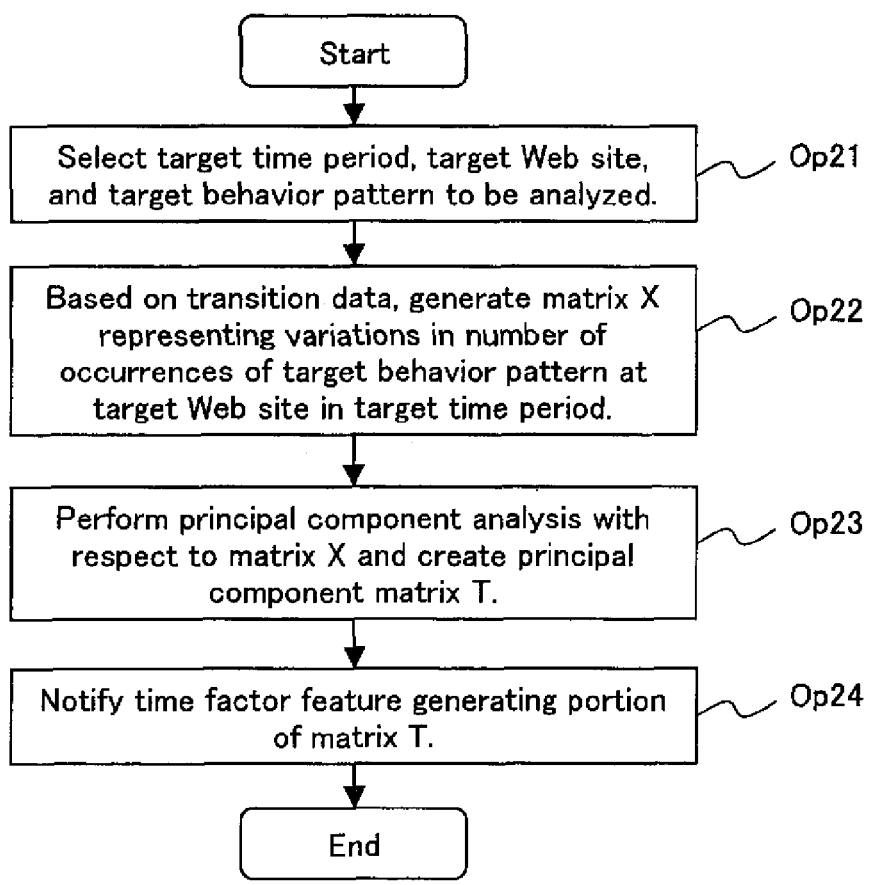

| Date | Behavior pattern ID |
|---|---|
| 2006/03/04 14:13 | P-0001 |
| 2006/03/04 14:24 | P-0002 |
| 2006/03/04 14:25 | P-0001 |
| 2006/03/04 15:09 | P-0003 |
| ⋮ | ⋮ |

Start

Op21 — Select target time period, target Web site, and target behavior pattern to be analyzed.

Op22 — Based on transition data, generate matrix X representing variations in number of occurrences of target behavior pattern at target Web site in target time period.

Op23 — Perform principal component analysis with respect to matrix X and create principal component matrix T.

Op24 — Notify time factor feature generating portion of matrix T.

End

FIG. 9

| Category | Day factor | Whether or not combining is performed and condition for combining | Whether or not combining into principal component is performed |
|---|---|---|---|
| Day of week | Sat, Sun, Mon, ....., Fri | Create combined factor of up to three consecutive days such as Sat, Sun, and Mon | Not performed |
| Month | Jan, Feb, ....., Dec | Create combined factor of three months, even in skipped order | Performed |
| Season | Spring, summer, autumn, winter | Not created | Not performed |
| Public holiday /substitute public holiday | Public holiday /substitute public holiday | Not applicable | Not performed |
| End of term | End of preceding term, end of following term, end of first half year, end of second half year | Not created | Not performed |

FIG. 11

| Extraction candidate day factor ID | Category | Day factor | Day factor value |
|---|---|---|---|
| 0001 | Day of week | Mon | 010000··· |
| 0002 | Day of week | Tue | 001000··· |
| 0003 | Day of week | ··· | ··· |
| 0004 | Day of week | Mon, Tue | 011000··· |
| 0005 | Day of week | Mon, Wed | 010100··· |
| ··· | Day of week | ··· | ··· |
| 0025 | Day of week | Mon, Tue, Wed | 011100··· |
| ··· | Day of week | ··· | ··· |
| 0061 | Month | Jan | 111111··· |
| 0062 | Month | Feb | 000000··· |
| ··· | Month | ··· | ··· |
| 0073 | Month | First principal component regarding month | 111111··· |
| 0074 | Month | Second principal component regarding month | 000000··· |
| ··· | Month | ··· | ··· |
| 0078 | Public holiday | Public holiday | 100000··· |
| 0079 | Season | Spring | 000000··· |
| ··· | Season | ··· | ··· |
| 0083 | End of term | End of preceding term | 000000··· |
| ··· | ··· | ··· | ··· |

FIG. 12

| List No. | Combination of day factors |
|---|---|
| 1 | 0001~0009,0011~0021··· |
| 2 | 0001~0008,0010,0015~0021··· |
| 3 | 0001~0005,0012~0021··· |
| ... | ... |

| Analysis ID | Target of analysis | Combination of day factors (eigen day factor group) | Coefficient matrix |
|---|---|---|---|
| 1 | Behavior to use service at mail-order site of Company A | "Mon," "Tue," ..., "Jan," ..., "public holiday," "end of term," ... | $\begin{pmatrix} A_{11} & \cdots & A_{1P} \\ \vdots & \cdots & \vdots \\ A_{F1} & \cdots & A_{FP} \end{pmatrix}$ |
| ... | | ... | ... |

TIME FACTOR FEATURE GENERATION SYSTEM, TIME FACTOR FEATURE GENERATION METHOD AND TIME FACTOR FEATURE GENERATION PROGRAM

BACKGROUND OF THE INVENTION

1. Field of the Invention

The present invention relates to a time factor feature generation system that analyses a time factor feature of a use status of a site such as, for example, a Web site providing a service such as e-banking, e-commerce or the like, a method of the analysis, and a program for the analysis.

2. Description of Related Art

For example, services such as e-banking, e-commerce and the like have been provided on Web sites on a computer network. Further, with an expectation of encouraging service users to use, sign contracts for, or purchase particular services, service providers deliver or present various electronic advertisements to the users through a network.

In presenting an electronic advertisement, it is possible to arbitrarily change a time period and a location for the presentation. Further, it is possible to estimate a reaction characteristic of uses with respect to the electronic advertisement based on, for example, log data of a service-providing site on the Web.

In recent years, advancement of IT technologies (for example, widespread use of mobile equipment/sensor actuators) has allowed services and electronic advertisements to be controlled finely so as to be suitable for the respective scenes of use by individual users. It has thus been requested that a method be established by which services and electronic advertisements on sites are controlled more finely and more efficiently than in the conventional cases.

Most site use behaviors of users exhibit time factor features. For example, site use tends to decrease on weekends, and there is a phenomenon in which some users use sites actively on a day whose number is a multiple of 5 of the month, while a group of other users uses sites actively on the $1^{st}$ Monday and last Friday of the month. Further, there is also a tendency for users to refrain from site use late at night of the day. For example, in the field of traffic information services, there has been disclosed a method of calculating a length of travel time required to arrive at a destination, with the degree of traffic congestion on the roads taken into consideration, which changes depending on a time factor such as a day of the week/public holiday/season/day whose number is a multiple of 5 or the like (see, for example, Non-Patent Document 1 below).

(Non-Patent Document 1) Masatoshi KUMAUGAI, Takumi FUSHIKI, Takayoshi YOKOTA, Yutaka SANO, and Kenji SUZUKI, "Development of Long-term Travel Time Forecast Method for Nationwide Traffic Information Services," Journal of Information Processing Society of Japan, published by Information Processing Society of Japan on Dec. 15, 2004, Volume 45, $12^{th}$ Issue, pp. 2,696-2,706.

Furthermore, as an example of analyzing a behavior characteristic of a user, there has been disclosed a system and a method in which a behavior of a user is analyzed based on information on a time at which a user's behavior to, for example, browse or purchase merchandise occurs, which has been recorded for each of a plurality of users (for example, JP 2000-285175 A). In this system, the users are classified into segments each constituted of a plurality of users who behave similarly, and an advertisement aimed at users in a target segment is run so as to precede the behavior of the users. However, the above-described conventional system is to analyze behaviors of users by recording time information for each user and therefore is not capable of analyzing, for example, time factor features of behaviors of users who access a site. That is, a time factor feature of a site use status cannot be analyzed quantitatively.

SUMMARY OF THE INVENTION

With the foregoing in mind, it is an object of the present invention to provide a time factor feature generation system, a time factor feature generation method, and a time factor feature generation program, by which data quantitatively showing a time factor feature of a site use status can be generated.

A time factor feature generation system according to the present invention includes: a use status grasping portion that extracts, from log data showing a use status of at least one site that is provided by a computer connected to a network, transition data showing variations in degree of use of the site in a predetermined time period; a variation data generating portion that generates, based on the transition data, variation data expressing the variations in degree of use of the site in the predetermined time period as a group Y of values showing the degree of use of the site; a time factor data recording portion in which data showing a plurality of time factors and a time factor value representing a time period specified by each of the plurality of time factors are recorded; a time factor extracting portion that extracts a time factor in accordance with a prerecorded procedure from among the plurality of time factors recorded in the time factor data recording portion and generates i groups $D_i$ of time factor values, each of which corresponds to the extracted time factor; and a time factor feature generating portion that calculates i coefficients $a_i$ such that a square of an error b has a minimum value in an equation below (Mathematical Equation 1) in which the groups $D_i$ and the group Y are used as an explaining variable and an explained variable, respectively thereby to generate data including the time factors corresponding to the groups $D_i$ and the coefficients $a_i$, each of which is obtained with respect to each of the groups $D_i$, as data showing a time factor feature of the use status of the site.

$$Y = \sum_i a_i D_i + b \qquad \text{[Mathematical Equation 1]}$$

The time factor feature generating portion calculates i coefficients $a_i$ such that a square of the error b has a minimum value in the above equation (Mathematical Equation 1) in which the group Y obtained from the transition data showing variations in degree of site use are used as an explained variable and the groups $D_i$ of time factor values are used as an explaining variable. As a result, the group Y can be approximated by a function of a time factor value. That is, a time factor feature of variations in degree of use of a site represented by the group Y is represented by the groups $D_i$ of time factor values, each of which corresponds to a time factor extracted by the time factor extracting portion and the coefficients $a_i$, each of which is obtained with respect to each of the groups $D_i$. Therefore, using the time factors corresponding to the groups $D_i$ and the coefficients $a_i$, each of which is obtained with respect to each of the groups $D_i$, the time factor feature generating portion can generate data quantitatively showing a time factor feature of a use status of a site. Thus, a time factor feature can be obtained that quantitatively represents a feature of a behavior of a group of site users.

By the use of data showing a time factor feature generated by the time factor feature generating portion, it becomes possible to forecast a change of a site use status depending on a time factor. Further, by managing a site using data showing a time factor feature of a site use status, for instance, it becomes possible to, for example, post an advertisement, conduct a campaign, and provide a service in a timely manner according to the time factor feature of the site use status.

Preferably, in the time factor feature generation system according to the present invention, the use status grasping portion extracts transition data representing variations in degree of use of a service provided by the site.

According to this configuration, the time factor feature generating portion can output data showing a time factor feature of a use status of a service provided by the at least one site. Thus, using generated data, for example, a site manager can provide a service and post an advertisement in a timely manner according to a time factor feature of a use status of a service provided by the at least one site.

Preferably, in the time factor feature generation system according to the present invention, the use status grasping portion extracts transition data representing variations in amount of an access to an advertisement provided by the site.

According to this configuration, the time factor feature generating portion can generate data showing a time factor feature of an access amount with respect to an advertisement provided by the at least one site. Thus, using generated data, for example, a site manager can post an advertisement and provide a service in a timely manner according to a time factor feature of an access amount with respect to an advertisement provided by the at least one site.

Preferably, in the time factor feature generation system according to the present invention, the use status grasping portion extracts transition data representing variations in number of occurrences of a behavior to access a particular advertisement provided by at least one site and use a service regarding the particular advertisement, which is provided by the site or another site.

According to this configuration, the time factor feature generating portion can generate data showing a time factor feature of a user's behavior to react to an advertisement provided by the at least one site and use a service. Thus, using generated data, for example, a site manager can post an advertisement and provide a service in a timely manner according to a time factor feature of a reaction behavior to an advertisement provided by the at least one site.

In the time factor feature generation system according to the present invention, the time factor data recording portion can be configured so that a time factor value that is a value representing at least one day specified by a corresponding time factor, among a plurality of days into which a continuous length of time is separated in a unit of day, is recorded with respect to each of the plurality of time factors.

In the time factor feature generation system according to the present invention, the time factor data recording portion can be configured so that a time factor value that is a value representing a time frame specified by one time factor, among a plurality of time frames into which a continuous length of time is separated in a unit of hour or minute, is recorded with respect to each of the plurality of time factors.

Preferably, the time factor feature generation system according to the present invention further includes: a user time factor feature recording portion that records data showing an attribute of a user and data showing a time factor feature of a status of use by a user having the attribute, correspondingly to each other; and a user analyzing portion that compares the data showing the time factor feature generated by the time factor feature generating portion with the data showing the time factor feature recorded in the user time factor feature recording portion thereby to specify an attribute of a user using the site.

An attribute of a site user is specified by the user analyzing portion, and thus a site manager can grasp an attribute of a group of site users. For example, regarding a site providing a certain advertisement, the manager of the site can grasp an attribute of a group of users to whom that advertisement has appealed.

Preferably, in the time factor feature generation system according to the present invention, the time factor extracting portion extracts a plurality of combinations of time factors from among the plurality of time factors recorded in the time factor data recording portion and generates a plurality of groups $D_i$ of time factor values, which correspond respectively to the combinations, and the time factor feature generating portion calculates the coefficient $a_i$ with respect to each of the plurality of groups $D_i$ of time factor values thereby to generate a plurality of pairs, each of which is composed of the coefficient $a_i$ and each of the groups $D_i$ of time factor values, selects a pair from among the plurality of pairs based on a predetermined standard, and generates data including the coefficient $a_i$ of the selected pair and time factors corresponding to the group $D_i$ of time factor values of the selected pair as data showing a time factor feature of a use status of the site.

The time factor feature generating portion generates data showing a time factor feature by using a pair selected based on a predetermined standard from among a plurality of pairs, each of which is composed of the coefficient $a_i$ and the group $D_i$ of time factor values. Therefore, it is possible to select, from among the plurality of pairs of the coefficients $a_i$ and the groups $D_i$ of time factor values, a pair explicitly representing a feature of a use status of the at least one site. As a result, the time factor feature generating portion can generate data showing a time factor feature that explicitly represents a feature of a use status of the at least one site.

Preferably, in the time factor feature generation system according to the present invention, the variation data generating portion expresses the variations in degree of use, which are shown by the transition data, as multi-variate data showing a degree of use, performs principal component analysis with respect to the multi-variate data thereby to extract a feature base, and obtain a group Y of principal component scores of the feature base, and the time factor extracting portion generates multi-variate data showing time factor values corresponding to the time factor extracted from among the plurality of time factors recorded in the time factor data recording portion, performs principal component analysis with respect to the multi-variate data thereby to extract a feature base, and obtain a group $D_i$ of principal component scores of the feature base.

According to this configuration, data amounts of both the group Y as an explained variable and the group $D_i$ as an explaining variable are compressed, and thus computational complexity in the time factor feature generating portion is reduced. Further, in the time factor feature generating portion, regression analysis is performed with respect to the groups of principal component scores that are based on their respective feature bases, and thus by the use of the group $D_i$ of time factor values that is highly independent, data showing a time factor feature explicitly explaining a feature of an explained variable is generated.

Preferably, in the time factor feature generation system according to the present invention, the variation data generating portion expresses the variations in degree of use, which are shown by the transition data, as multi-variate data showing a degree of use, performs principal analysis with respect to the multi-variate data thereby to extract feature bases, further extracts a feature interval in which one of the extracted feature bases deviates by a predetermined amount or more from the other feature bases, and obtain a group Y of principal component scores of the one of the extracted feature bases in the feature interval, and the time factor extracting portion generates a group of time factor values included in the feature interval as the group $D_i$.

According to this configuration, the variation data generating portion can obtain a group Y of principal component scores representing only variations in an interval in which highly independent and distinctive variations in degree of use are observed. Further, the time factor extracting portion can generate a group of time factor values based on an interval in which highly independent and distinctive variations in degree of use are observed. That is, the group $D_i$ is generated using distinctive time factor values. Thus, the time factor feature generating portion can efficiently generate data showing a time factor feature regarding a distinctive interval.

Preferably, in the time factor feature generation system according to the present invention, the variation data generating portion expresses the variations in degree of use, which are shown by the transition data, as multi-variate data showing a degree of use, performs principal component analysis with respect to the multi-variate data thereby to extract a plurality of feature bases, and generates a group Y of principal component scores of each of the plurality of extracted feature bases, the time factor extracting portion generates the group $D_i$ with respect to each of the plurality of feature bases, and the time factor feature generating portion calculates a coefficient $a_i$ with respect to the group Y corresponding to the each of the plurality of feature bases using the group $D_i$ corresponding to the each of the plurality of feature bases and merges the groups $D_i$ and the coefficients $a_i$ of the plurality of feature bases thereby to generate data showing a time factor feature of a use status of the site.

By merging of pairs, each of which is composed of the group $D_i$ and the coefficient $a_i$ that represent a distinctive time factor feature of each feature base, the time factor feature generating portion can generate highly precise data showing a time factor feature of a use status of a site.

Preferably, in the time factor feature generation system according to the present invention, the variation data generating portion expresses the variations in degree of use, which are shown by the transition data, as multi-variate data showing a degree of use, performs principal component analysis with respect to the multi-variate data thereby to extract a feature base, and obtain a group Y of principal component scores of the feature base, and the time factor extracting portion calculates a correlation coefficient showing a correlation between the principal component scores of the feature base extracted by the variation data generating portion and time factor values corresponding to at least one of the plurality of time factors recorded in the time factor data recording portion and extracts a time factor based on the correlation coefficient.

Based on a correlation coefficient showing a correlation with principal component scores of a feature base extracted by the variation data generating portion, the time factor extracting portion extracts a time factor that corresponds to time factor values to be included in the group $D_i$. Thus, time factor values appropriate as an explaining variable that explicitly explains a feature of a feature base can be included in the group $D_i$.

According to the present invention, it is possible to provide a time factor feature generation system, a time factor feature generation method, and a time factor feature generation program that allow the generation of data quantitatively showing a time factor feature of a use status of a site.

BRIEF DESCRIPTION OF THE DRAWINGS

FIG. 2(a) is a diagram showing an example of data that is a list of N (=365) days of M (=144) values per day. FIG. 2(b) is a diagram showing an example of data representing principal component scores, which is obtained by compression of the data shown in FIG. 2(a) using principal component analysis.

FIG. 3 is a diagram showing an example of day factor data that is recorded in a time factor data recording portion 11.

FIG. 6(a) is a diagram showing a service basic information table as an example of basic information on a service group. FIG. 6(b) is a diagram showing an advertisement basic information table as an example of basic information on an advertisement group.

FIG. 7 is a diagram showing a behavior pattern table as an example of data showing service use behavior patterns.

FIG. 8 is a diagram showing a transition data table as an example of transition data.

FIG. 9 is a flow chart showing a specific example of processing in which a variation data generating portion generates variation data based on transition data.

FIG. 11 is a diagram showing a mother group extracting condition table as an example of data included in extraction procedure data.

FIG. 12 is a diagram showing an example of mother group data representing a time factor mother group.

FIG. 13 is a diagram showing an extraction list table as an example of data representing an extraction list.

DETAILED DESCRIPTION OF THE INVENTION

First Embodiment

Figure 1:
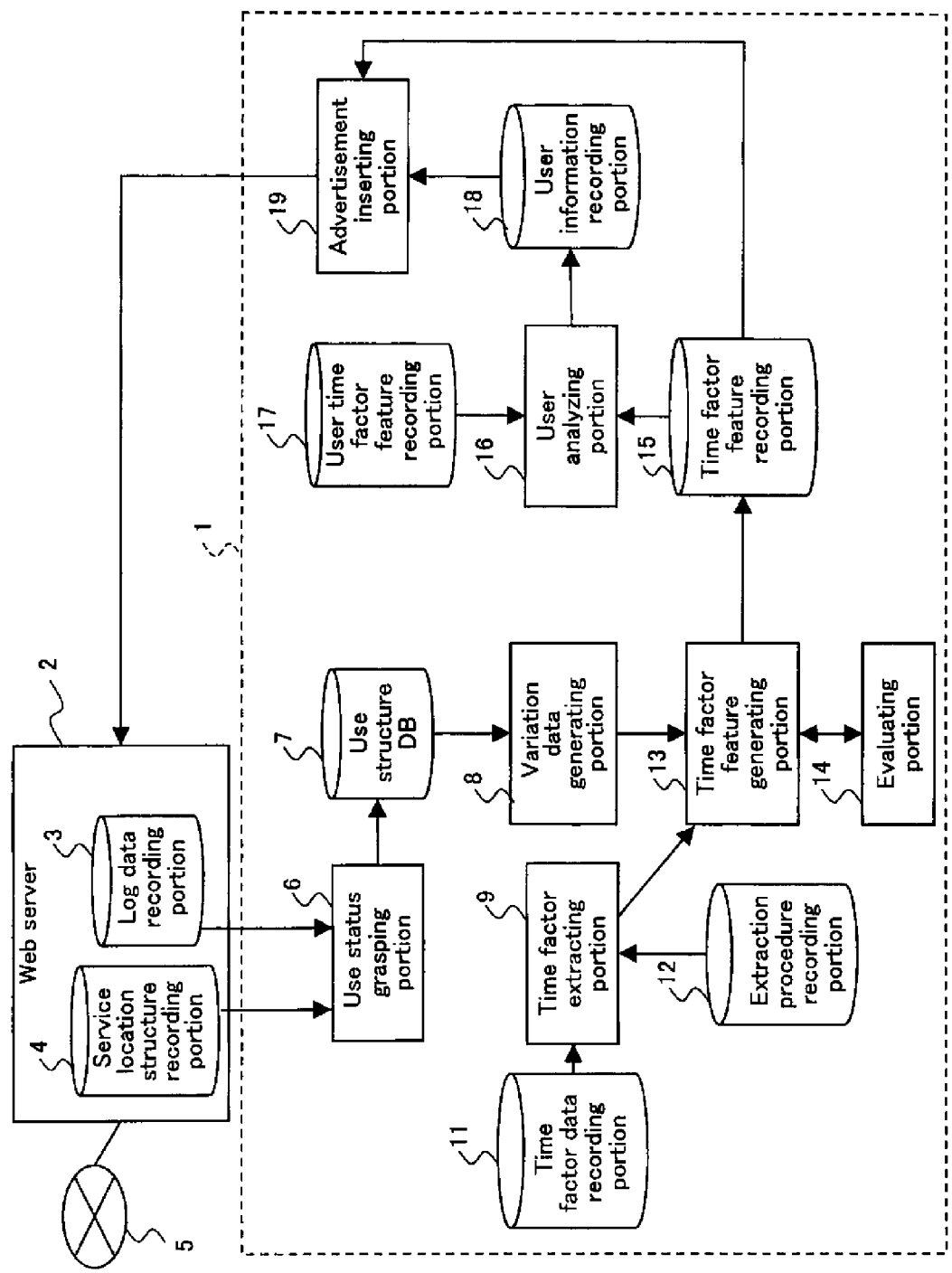
FIG. 1 is a functional block diagram showing a configuration of a time factor feature generation system according to a first embodiment.

FIG. 1 is a functional block diagram showing a configuration of a time factor feature generation system according to this embodiment. As shown in FIG. 1, a time factor feature generation system 1 is connected to a Web server 2. The Web server 2 provides a Web site accessible from another computer connected to an Internet 5. A user accesses the Web site via the another computer and thus can enjoy information or a service provided by the Web server 2. The Web server 2 includes a log data recording portion 3 and a service location structure recording portion 4. The log data recording portion 3 records log data showing a use status of the Web site. The service location structure recording portion 4 records data on a service or an advertisement that is provided by the Web site.

The time factor feature generation system 1 is a system in which a time factor feature of a status of use by a user of a service or an advertisement provided by the Web server 2 is analyzed using data recorded in the log data recording portion 3 and the service location structure recording portion 4 of the Web server 2. The time factor feature generation system 1 includes a use status grasping portion 6, a use structure DB 7, a variation data generating portion 8, a time factor extracting portion 9, a time factor data recording portion 11, an extraction procedure recording portion 12, a time factor feature generating portion 13, an evaluating portion 14, a time factor feature recording portion 15, a user analyzing portion 16, a user time factor feature recording portion 17, a user information recording portion 18, and an advertisement inserting portion 19.

The time factor feature generation system 1 is constructed on a computer such as a server machine, a personal computer, a work station or the like. The use status grasping portion 6, the variation data generating portion 8, the time factor extracting portion 9, the time factor feature generating portion 13, the evaluating portion 14, the user analyzing portion 16, and the advertisement inserting portion 19 of the time factor feature generation system 1 may be configured on one computer or may be configured so as to be distributed respectively on a plurality of computers. Further, a CPU of a computer executes a predetermined program, and thus the respective functions of the use status grasping portion 6, the variation data generating portion 8, the time factor extracting portion 9, the time factor feature generating portion 13, the evaluating portion 14, the user analyzing portion 16, and the advertisement inserting portion 19 are realized. Therefore, each of a program for executing the above-described respective functions and a recording medium on which the program is recorded is also one embodiment of the present invention. Further, the time factor data recording portion 11, the extraction procedure recording portion 12, the time factor feature recording portion 15, the user time factor feature recording portion 17, and the user information recording portion 18 are embodied by a recording medium included in a computer such as a memory, a hard disk or the like.

Based on data read in from the log data recording portion 3 and the service location structure recording portion 4, the use status grasping portion 6 generates transition data showing variations in degree of use of a site provided by the Web server 2 in a predetermined time period and records the transition data in the use structure DB 7. Examples of the data the use status grasping portion 6 reads in from the service location structure recording portion 4 include information on a service provided on a Web site of the Web server 2.

Examples of the data the use status grasping portion 6 reads in from the log data recording portion 3 include histories of an access to a Web site of the Web server 2. Examples of the transition data that is recorded in the use structure DB 7 include data representing variations in degree of use of a service provided by a Web site or in amount of an access to an advertisement provided by a Web site. The above-described variations in degree of service use or in amount of an access to an advertisement are expressed by, for example, variations in number of occurrences of a particular behavior pattern. Further, examples of other behavior patterns include a behavior pattern in which a user accesses a particular advertisement provided by a Web site and uses a service regarding a particular advertisement provided by said Web site or another Web site (advertisement-reaction behavior).

Based on the transition data recorded in the use structure DB 7, the variation data generating portion 8 generates variation data representing variations in degree of use of a Web site of the Web site 2 in a predetermined time period. The variation data is expressed by a group Y of values showing the degree of use of the above-described Web site. The values showing the degree of use of the above-described Web site are, for example, the number of accesses to a predetermined URL, the number of times a predetermined button is clicked, the number of occurrences of a predetermined behavior pattern, the number of times a session is started, the length of a session time, and the average length of time in which a user stays in a session.

The variation data generating portion 8 can express variations in degree of use of a Web site in a time period of N days by, for example, a N×M matrix X. In this case, one row is composed of M values showing variations in degree of use in one day, and this row is listed the number of times corresponding the number of days (N rows) to configure the matrix X. FIG. 2(*a*) is a diagram showing an example of data that is a list of N (=365) days of M (=144) values per day obtained at respective measurement times. The data shown in FIG. 2(*a*) is configured by (N=365) rows corresponding to one year, in each of which M (=144) values showing the degree of use obtained every 10 minutes in the period of time between 0:00 and 23:50 are listed.

In order to reduce computational complexity, preferably, using principal component analysis, the variation data generating portion 8 generates as the variation data (group Y), a principal component score matrix by compression of the number of columns or rows of the N×M matrix X. FIG. 2(*b*) is a diagram showing an example of data representing principal component scores of a matrix obtained by compression of the matrix representing the data shown in FIG. 2(*a*) using principal component analysis. The data shown in FIG. 2(*b*) is configured by columns listed from a first principal component to a $p^{th}$ principal component, each of which includes N days of principal component scores regarding one feature base (principal component).

Now, the description is directed to a specific example in which the variation data generating portion 8 calculates a principal component score matrix. Using a M-dimensional matrix vector x representing an average value in each row in the above-described matrix X (=an average value obtained at each time, namely, an average variation) and a N-dimensional vector e all elements of which are 1, the variation data generating portion 8 determines a matrix X* by subjecting X to column centering according to an equation (1) below.

$$X^* = X - e \cdot x \quad (1)$$

The variation data generating portion 8 performs principal component analysis with respect to the matrix X* obtained by column centering of the above-described N×M matrix. As a result, a vector representing a principal component (=feature base) of the matrix X* and a contribution rate of each of feature bases can be obtained. The variation data generating portion 8 fetches from among the feature bases, p feature bases whose contribution rates exceed a threshold value, and generates a feature base matrix P (M×p matrix).

Based on the feature base matrix P, the variation data generating portion 8 calculates principal component scores of the matrix X* representing variations in degree of use of a Web site. For example, a matrix T representing principal component scores is calculated using the feature base matrix P according to an equation (2) below.

$$T = X^* \cdot P \quad (2)$$

In this case, the matrix T is in the form of a N×p matrix. Each column of the matrix T represents a principal component score of each of the feature bases. The foregoing described an example of calculating a principal component score matrix. In the foregoing, it is assumed that the matrix X representing variations in degree of use of a Web site is in the form of a two-dimensional matrix (N×M matrix). However, in the case where the matrix X is a one-dimensional vector, it is not necessary that the variation data generating portion 8 perform compression processing using principal component analysis.

In accordance with a prerecorded procedure, the time factor extracting portion 9 extracts a time factor from among a plurality of time factors recorded in the time factor data recording portion 11, and generates a group of a predetermined number of time factor values corresponding respectively to the extracted time factor.

A "time factor (referred to also as a "time species")" refers to a named time period having one particular attribute. Particularly, a named time period that can be separated off as a unit of one day or a plurality of days and has a particular attribute is referred to as a "day factor (referred to also as a "day species")." Examples of the day factors include "Monday," "Tuesday," a "public holiday," a "beginning of a cold season," a "day whose number is a multiple of 5," a "weekend," "Bon Festival," an "end of the year," a "new year's day," "Christmas," an "awaking of insects" season, a "spring," a "late summer with lingering heat," a "hay fever season," a "severe winter season," a "snow season," "Golden Week holidays," a "pay day," an "income tax return," a "new moon," a "full moon," a "fair weather," a "rainy weather," a "tropical night," a "most lucky day," and a "most unlucky day."

Examples of the time factor include, as well as a time period that can be separated off as a unit of one day or a plurality of days, a named time frame expressed in terms of an hour or a minute, and a named time period expressed in terms of a week, a month, a year or others. Examples of a named time frame expressed in terms of an hour or a minute include a "midnight," an "early morning," "every exact hour," and a "commuter rush" hour.

In the time factor data recording portion 11, data showing a plurality of time factors and a time factor value representing a time period specified by each of the plurality of time factors are recorded. The time factor value can be, for example, a value that represents a time period specified by a time factor, among a plurality of time periods into which a continuous length of time is separated in a predetermined unit. FIG. 3 is a diagram showing an example of day factor data that is recorded in the time factor data recording portion 11. In the day factor data shown in FIG. 3, data showing day factors such as "Monday," "Tuesday," "Wednesday," a "public holiday/substitute public holiday," a "beginning of a cold season," a "day whose number is a multiple of 5," "January," and the like is recorded in the uppermost row. A day factor value that indicates a day specified by each of the day factors is recorded in each column. The day factor value is a discrete value that is recorded in a row direction for each day of the period of time between Jan. 1, 2006 and Dec. 31, 2006, and "1" is recorded with respect to a day corresponding to each of the day factors, while "0" is recorded with respect to each of the other days.

Now, the description is directed to an example of a calculation performed in the case where the time factor extracting portion 9 extracts a day factor from among the day factor data shown in FIG. 3 and generates a group of day factor values. The group of day factors generated by the time factor extracting portion 9 is expressed by, for example, a day factor matrix D. A mathematical equation 2 below (equation (3)) shows a specific example of the time factor matrix D generated in the case where "Monday," "Tuesday," a "public holiday/substitute public holiday" and a "day whose number is a multiple of 5" are extracted from among time factors included in the day factor data shown in FIG. 3.

[Mathematical Equation 2]

$$D = \begin{pmatrix} 0 & 0 & 1 & 0 \\ 1 & 0 & 0 & 0 \\ 0 & 1 & 0 & 0 \\ 0 & 0 & 0 & 0 \\ 0 & 0 & 0 & 1 \\ \vdots & \vdots & \vdots & \vdots \\ 0 & 0 & 0 & 0 \end{pmatrix} \quad (3)$$

In the time factor matrix D in the above equation (mathematical equation 2), columns represent day factor values of the time factors "Monday," "Tuesday," a "public holiday/substitute public holiday," and a "day whose number is a multiple of 5", respectively. In each column, an element "0" or "1" is listed in order for each day of the period of time between Jan. 1, 2006 and Dec. 31, 2006. The time factor extracting portion 9 may compress the number of columns or rows of the matrix D using principal component analysis. Further, the time factor extracting portion 9 may generate the day factor matrix D so that day factor values with respect to some days of the period of time between Jan. 1, 2006 and Dec. 31, 2006 are included in the day factor matrix D.

Preferably, the number of rows of the matrix D is equal to N of the N×M matrix X generated in the above-described variation data generating portion 8. For example, preferably, assuming that variation data is obtained with respect to the time period between Jan. 1, 2006 and Dec. 31, 2006, the matrix D includes time factor values obtained also with respect to the time period between Jan. 1, 2006 and Dec. 31, 2006. The details of processing by the time factor extracting portion 9 will be described later.

Based on the variation data generated by the variation data generating portion 8 and the time factor extracted by the time factor extracting portion 9 as well as the group of time factor values corresponding respectively to the time factor, the time factor feature generating portion 13 generates data showing time factor features and records the data in the time factor feature recording portion 15. The following describes an example in which, for example, in the case where the variation data generating portion 8 generates the above-described principal component score matrix T (N×p matrix) as variation data and the time factor extracting portion 9 generates the above-described day factor matrix D (f×N matrix) as a group of time factor values, the time factor feature generating portion 13 generates data showing time factor features. The time factor feature generating portion 13 calculates a coefficient matrix A (f×p matrix) such that a square of an error b has a minimum value in an equation (4) below in which the day factor matrix D and the principal component score matrix T are used as an explaining variable and an explained variable, respectively.

$$T = D \cdot A + b \quad (4)$$

The above equation (4) is an equation in which the matrix T representing variations in degree of use of a Web site is expressed using the day factor matrix D, and therefore, day factor features of a use status of a Web site is expressed by the day factor matrix D and the coefficient matrix A in the above equation (4). That is, the day factor matrix D and the coefficient matrix A constitute data quantitatively representing variations in use status of a Web site that occur due to day factors. Further, using day factors corresponding to the day factor matrix D and the coefficient matrix A, a forecast value showing each future use status of a Web site can be calculated. The following describes an example in which, for example, in the case where the day factor matrix D and the principal component score matrix T are data representing day factor values and data representing variations in degree of use of a Web site, respectively, which are both obtained in the time period between Jan. 1, 2006 and Dec. 31, 2006, a calculation is performed for forecasting variations in degree of use of the Web site in the period of time between Jan. 1, 2007 and Dec. 31, 2007. In this case, with respect to the day factors corresponding to the day factor matrix D, a matrix $D_{2007}$ representing day factor values with respect to the period of time between Jan. 1, 2007 and Dec. 31, 2007 is created. Using this matrix $D_{2007}$, a matrix $T_{2007}$ representing forecast values of variations in degree of use of the Web site in the period of time between Jan. 1, 2007 and Dec. 31, 2007 can be calculated according to an equation (5) below.

$$T_{2007} = D_{2007} \cdot A \cdot P^T + e \cdot x \quad (5)$$

In the above equation (5), $P^T$ represents a transposed matrix of the matrix P, and as for e·x, the same applies as described with regard to the above equation (1).

As described above, using time factors corresponding to the day factor matrix D and the coefficient matrix A, a use status of a Web site can be forecast. Thus, as data showing time factor features of a use status of a Web site, the time factor feature generating portion 13 records in the time factor feature recording portion 15, for example, day factors corresponding to the day factor matrix D (namely, day factors extracted by the time factor extracting portion 9) and the coefficient matrix A with respect to the day factor matrix D.

The time factor extracting portion 9 extracts a plurality of combinations of day factors (assumed to be n combinations), and generates n day factor matrices D (n) corresponding respectively to the combinations. The time factor feature recording portion 15 calculates the coefficient matrix A with respect to each of the n day factor matrices D (n) so that data showing time factor features can be generated.

The evaluating portion 14 evaluates the data showing time factor features, which is generated by the time factor feature generating portion 13, and notifies the time factor feature generating portion 13 of an evaluation result. For example, the evaluating portion 14 generates forecast precision showing how precisely a use status of a Web site can be forecast using data showing time factor features. Further, the evaluating portion 14 may generate a value showing validity of each of combinations of time factors extracted by the time factor extracting portion 9.

Based on the evaluation by the evaluating portion 14, the time factor feature generating portion 13 can select an optimum day factor matrix $D_{ideal}$ from among the n day factor matrices D (n). As data showing time factor features, the time factor feature generating portion 13 records in the time factor feature recording portion 15, data including time factors corresponding to the selected day factor matrix $D_{ideal}$ and the coefficient matrix A with respect thereto.

Using the data showing time factor features, which is recorded in the time factor feature recording portion 15, the user analyzing portion 16 analyzes an attribute of a user who has used a Web site. In the user information recording portion 18, data showing an attribute of a user and data showing a time factor feature of a use status of the Web site by a user having that attribute are recorded correspondingly to each other. The user analyzing portion 16 compares the data showing time factor features, which is recorded in the time factor feature recording portion 15, with data showing a time factor feature, which is recorded in the user time factor feature recording portion 17, and thereby specifies an attribute of a user using the Web site. By the user analyzing portion 16, the specified attribute of the user of the Web site and the time factor feature of the corresponding use status of the Web site are recorded correspondingly to each other in the user information recording portion 18.

Using the data showing time factor features, which is recorded in the time factor feature recording portion 15, the advertisement inserting portion 19 determines the most appropriate timing for providing an advertisement to the Web site and inserts the advertisement to the Web site. The advertisement inserting portion 19 inserts the advertisement by updating or adding a file of the Web site recorded in the Web server 2.

For example, using the data showing time factor features, the advertisement inserting portion 19 forecasts timing in which the Web site is used frequently and inserts an advertisement to the Web site at that timing. In the case where the data showing time factor features includes, for example, day factors corresponding to the day factor matrix D regarding the number of accesses to or a reaction behavior to an advertisement on a certain Web site in the year 2006 and the coefficient matrix A with respect to the day factor matrix D, the advertisement inserting portion 19 can forecast variations in the number of accesses to or the reaction behavior to the advertisement on the Web site in the year 2007 by substituting these data into the above equation (5). Thus, an advertisement can be provided in a timely manner so as to be suitable for a time factor feature of a use status of a Web site.

Furthermore, using the data recorded in the user information recording portion 18, the advertisement inserting portion 19 can also determine optimum timing for providing an advertisement with respect to users having a particular attribute and insert the advertisement at the optimum timing.

(Operation of the Time Factor Feature Generation System 1)

Figure 4:
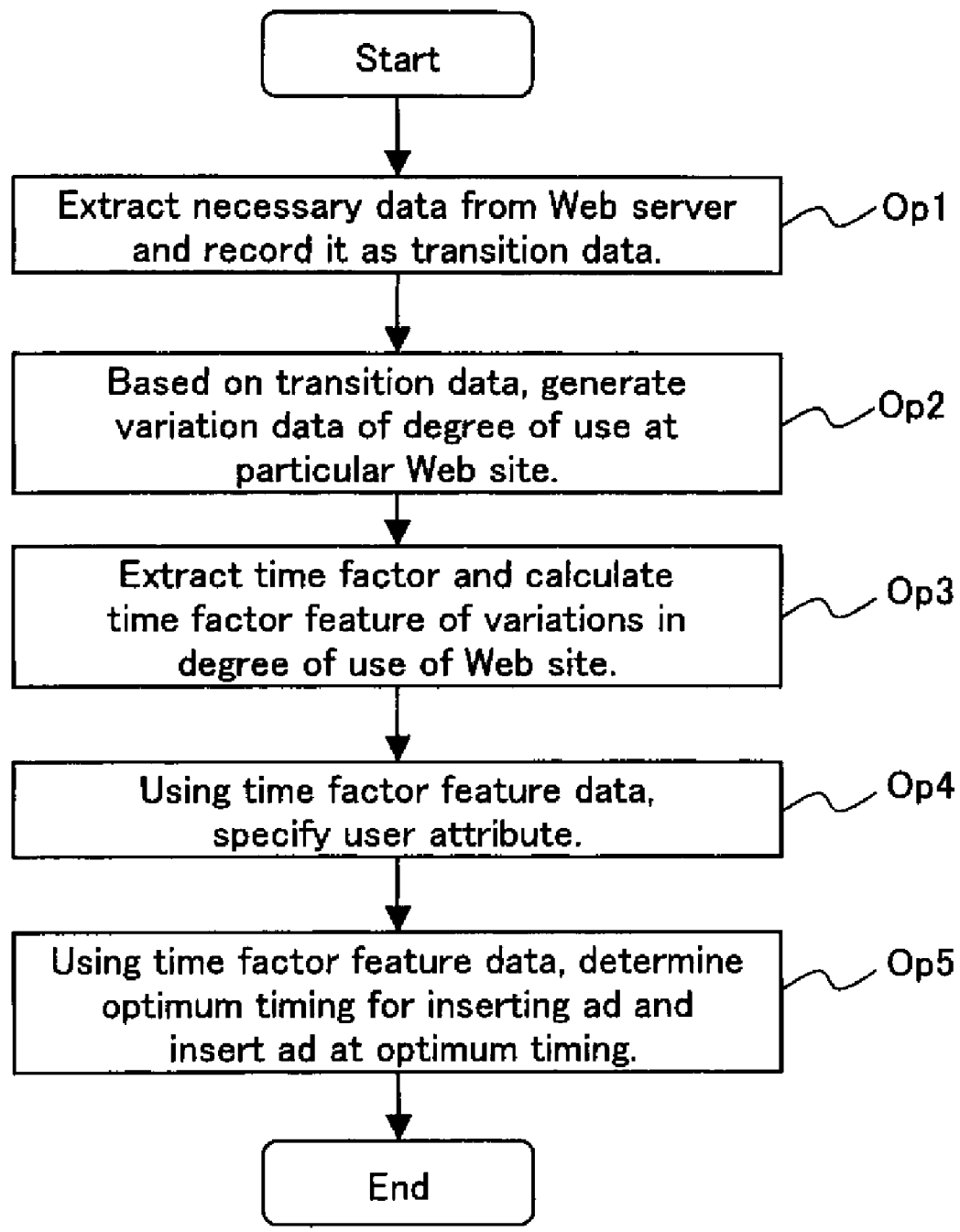
FIG. 4 is a flow chart showing a general flow of an operation example of a time factor feature generation system 1.

The description is directed next to an operation of the time factor feature generation system 1. FIG. 4 is a flow chart showing a general flow of an operation example of the time factor feature generation system 1. As shown in FIG. 4, first, the use status grasping portion 6 reads in necessary data from the log data recording portion 3 and the service location structure recording portion 4, generates transition data and records it in the use structure DB 7 (Op 1).

Next, based on the transition data, the variation data generating portion 8 generates variation data of the degree of use of a particular Web site (Op 2). After that, the time factor extracting portion 9 extracts a time factor and a time factor value thereof from the time factor data recording portion 11, and the time factor feature generating portion 13 generates data showing a time factor feature of variations in the degree of use of the Web site shown by the variation data (Op 3).

After that, using the data showing the time factor feature, the user analyzing portion 16 specifies an attribute of a user of the Web site (Op 4). Further, using the data showing the time factor feature, the advertisement inserting portion 19 determines optimum timing for inserting an advertisement to the Web site, and inserts the advertisement at the optimum timing (Op 5).

By the processing shown in FIG. 4, data showing a time factor feature of variations in degree of use of a particular Web site of the Web server 2 is generated. Further, data showing an attribute of a user of that Web site and optimum timing for inserting an advertisement to the Web site is obtained. Specific examples of processings in Op 1 to Op 3 and Op 5 in the operation example shown in FIG. 4 will be described later. Further, the operation of the time factor feature generation system 1 is not limited to the operation example shown in FIG. 4.

(Specific Example of Processing in which the User Status Grasping Portion 6 Generates Transition Data (Op 1))

Figure 5:
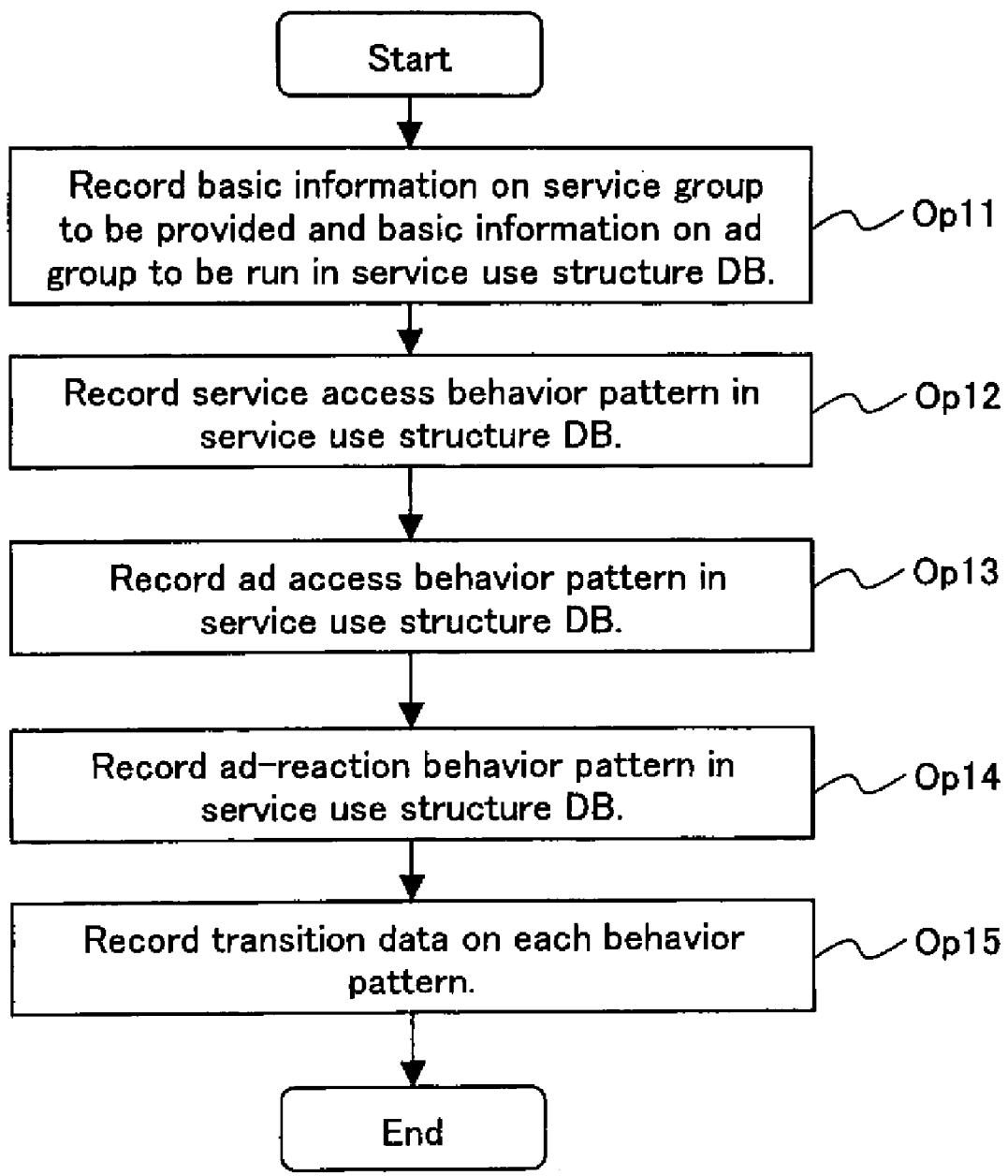
FIG. 5 is a flow chart showing a specific example of processing in which a use status grasping portion generates transition data.

FIG. 5 is a flow chart showing a specific example of processing in which the use status grasping portion 6 generates transition data (Op 1). As shown in FIG. 5, first, the use status grasping portion 6 reads out basic information on a service group and an advertisement group that are provided by the Web server 2 by way of a Web site group from the service location structure recording portion 4 and records the basic information in the use structure DB 7 (Op 11). Examples of the basic information on a service group and an advertisement group include information on a site such as a location at which a service or an advertisement is provided (site), a URL of a page constituting a Web site, and an action of a user at a site.

FIG. 6($a$) is a diagram showing a service basic information table 21 as an example of basic information on a service group that is recorded in the use structure DB 7. In the service basic information table 21, a service ID for identifying a service, a service location (site), a URL of a page included in a Web site, and a possible action of a user at each page are recorded for each service. FIG. 6($b$) is a diagram showing an advertisement basic information table 22 as an example of basic information on an advertisement group that is recorded in the use structure DB 7. In the advertisement basic information table 22, an advertisement ID for identifying an advertisement, an advertisement location (site), a URL of a page included in a Web site, and a possible action of a user at each page are recorded for each advertisement.

Next, based on an access log recorded in the log data recording portion 3, the use status grasping portion 6 records data showing a behavior pattern of a user at least one Web site, who has used a service provided by the Web server 2, in the use structure DB 7 (Op 12).

For example, the use status grasping portion 6 extracts a URL of a target Web site and an action of a user from the service base information table 21, and extracts a log corresponding to the extracted URL and action of a user from the log data recording portion 3. The use status grasping portion 6 generates data showing a behavior pattern by subjecting the extracted log to quantitative analysis (trend analysis) and clustering.

FIG. 7 is a diagram showing a behavior pattern table 23 as an example of data showing service use behavior patterns. In the behavior pattern table 23, a behavior pattern ID and information showing a behavior pattern corresponding thereto are recorded correspondingly to each other. As for the information showing a behavior pattern, an action that is included in the behavior pattern is indicated by a value "1", and an action that is not included in the behavior pattern is indicated by a value "0". For example, a behavior pattern of a behavior pattern ID="P-0001" represents a behavior pattern in which browsing an advertisement site of a mail-order company A, pressing an order button at the advertisement site of the mail-order company A, and browsing an e-commerce site of a company B are performed in order.

Further, the use status grasping portion 6 records in the use structure DB 7, data showing an advertisement access behavior pattern of a user at least one Web site, who has accessed an advertisement of a service provided by the Web server 2 (Op 13). The data showing an advertisement access behavior pattern can be, for example, as shown in a table obtained by replacing actions of each behavior pattern in the behavior pattern table 23 shown in FIG. 7 with advertisement access actions.

Further, the use status grasping portion 6 records in the use structure DB 7, data showing an advertisement-reaction behavior pattern of a user at least one Web site, who has accessed an advertisement provided by the Web server 2 and then used a service provided by the Web server 2 (Op 14). The data showing an advertisement-reaction behavior pattern can be, for example, as shown in a table obtained by replacing actions of each behavior pattern in the behavior pattern table 23 shown in FIG. 7 with actions included in an advertisement-reaction behavior.

Based on an access log recorded in the log data recording portion 3, the use status grasping portion 6 generates transition data representing variations in number of occurrences of each of the behavior patterns and records the transition data in the use structure DB 7 (Op 15). FIG. 8 is a diagram showing a transition data table 24 as an example of the transition data. In the transition data table 24, a behavior pattern ID and data showing a date and a time of the occurrence of a behavior pattern corresponding thereto are recorded correspondingly to each other. The transition data table 24 is used when the variation data generating portion 8 generates variation data representing variations in number of occurrences of a particular behavior pattern.

The foregoing described an example of processing in which the use status grasping portion 6 records transition data in the use structure DB 7. However, a method of obtaining transition data and a structure of transition data are not limited to the above-described example.

(Specific Example of Processing in which the Variation Data Generating Portion 8 Generates Variation Data (Op 2))

FIG. 9 is a flow chart showing a specific example of processing in which based on transition data, the variation data generating portion 8 generates variation data. The variation data generating portion 8 first selects a time period, a Web site and a behavior pattern as targets of an analysis of a time factor feature (Op 21). For example, the variation data generating portion 8 may make the above-described selection by accepting an instruction for the selection from a user via a user interface, or may make the above-described selection based on prerecorded data.

The variation data generating portion 8 may select a target Web site from a service location or an advertisement location that is recorded in, for example, the service base information table 21 and the advertisement base information table 22, which are shown in FIGS. 6(*a*) and 6(*b*), respectively. Further, a target behavior pattern may be selected from the behavior pattern table 23 shown in FIG. 7. For example, the variation data generating portion 8 can select one particular advertisement location as a target Web site and select an access behavior to an advertisement at that advertisement location or an advertisement-reaction behavior to that advertisement.

The variation data generating portion 8 may use all the time periods, all the Web sites and all the behavior patterns, which are shown by the transition data, as target time periods, target Web sites and target behavior patterns, respectively. Further, items that are selected by the variation data generating portion 8 to determine targets of an analysis are not limited to a time period, a Web site and a behavior pattern as described above. For example, items to be selected may include a user or a user group as a target of an analysis.

Based on the transition data, the variation data generating portion 8 accumulates the number of occurrences per given length of time of the target behavior pattern at the target Web site in the target time period that have been selected in Op 21 and generates a matrix X (Op 22). For example, in the case of accumulating the number of occurrences per 10 minutes of a target behavior pattern in the time period of 365 days from Jan. 1, 2006 till Dec. 31, 2006, the variation data generating portion 8 generates a matrix X in which a row of elements per day, each of which represent the number of occurrences per 10 minutes in one day, is provided for 365 days (365 rows). In this case, the elements of the matrix X are listed in the same manner as in the case of the data shown in FIG. 2(*a*).

Next, the variation data generating portion 8 performs principal component analysis with respect to the matrix X and generates a principal component score matrix T (Op 23). The principal component score matrix T is calculated as in the above-described example of the calculation. The variation data generating portion 8 notifies the time factor feature generating portion 13 of the principal component score matrix T (Op 24). Using the principal component score matrix T, the time factor feature generating portion 13 can generate data showing a time factor feature of variations in number of occurrences of a target behavior pattern at a target Web site in a target time period.

(Specific Example of Processing in which the Time Factor Extracting Portion 9 Extracts a Time Factor, and the Time Factor Feature Generating Portion 13 Generates Data Showing a Time Factor Feature) (Op 3))

Figure 10:
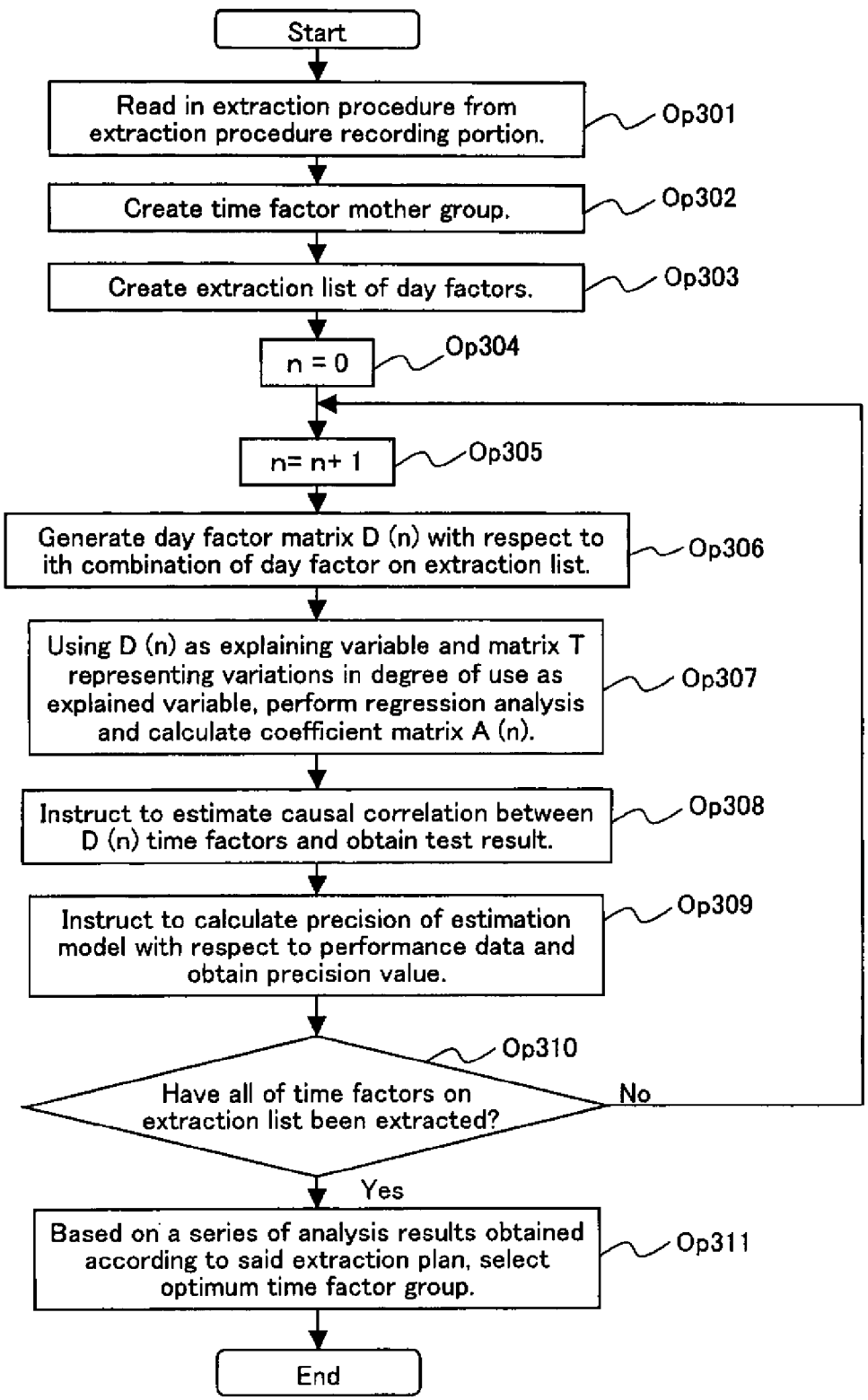
FIG. 10 is a flow chart showing a specific example of processing in which a time factor extracting portion extracts a time factor, and a time factor feature generating portion generates data showing a time factor feature.

FIG. 10 is a flow chart showing a specific example of processing in which the time factor extracting portion 9 extracts a time factor, and the time factor feature generating portion 13 generates data showing a time factor feature (Op 3). As shown in FIG. 10, first, the time factor extracting portion 9 reads in extraction procedure data from the extraction procedure recording portion 12 (Op 301). The extraction procedure data is data that represents a procedure or a condition used to extract a time factor from among a plurality of time factors recorded in the time factor data recording portion 11, and has been recorded beforehand in the extraction procedure recording portion 12. Examples of the extraction data include data representing a condition for creating a day factor mother group, which will be described later, and data representing a procedure for creating an extraction list.

Based on the extraction procedure data, the time factor extracting portion 9 creates a time factor mother group (Op 302). The time factor mother group is a group of time factors with respect to which the time factor extracting portion 9 performs extraction. The time factor mother group is created based on time factors recorded in the time factor data recording portion 11. For example, part of the time factors recorded in the time factor data recording portion 11 forms a time factor mother group. Further, the time factor mother group may also include, for example, a time factor obtained by combining a plurality of time factors and a time factor obtained by combining a plurality of time factors into a principal component. The following description is directed to an example of a case where a time factor mother group is generated from the day factor data shown in FIG. 3.

FIG. 11 is a diagram showing a mother group extraction condition table 25 as an example of data included in the extraction procedure data. In the mother group extraction condition table 25, data showing categories of day factors, and data showing day factors included in each of the categories, whether or not day factors in each of the categories are combined as well as a condition for the combining, and whether or not day factors are combined into a principal component are recorded for each of the categories. Herein, combining day factors refers to creating a combined day factor by combining two or more day factors among day factors included in a category. Further, combining day factors into a principal component refers to generating a combined day factor by performing principal component analysis with respect to a plurality of day factors included in a category. For example, with respect to each major principal component extracted by principal component analysis, the time factor extracting portion 9 can extract day factors from the each major principal component, which have eigen vectors whose absolute value components are large, and generate a combined day factor using only the extracted day factors.

The following describes an example of processing of creating a time factor mother group based on the mother group extraction table 25. First, the time factor extracting portion 9 determines day factors included in the categories "day of the week," "month," "season," "public holiday/substitute public holiday," and "end of term" of the mother group extraction condition table 25 as an extraction range with respect to which mother group extraction is to be performed, and add all the day factors in the extraction range to a time factor mother group.

Next, by referring to the data on whether or not day factors are combined and a condition for the combining in the mother group extraction condition table 25, the time factor extracting portion 9 judges whether or not day factors should be combined in each of the categories. In the case where the combining is performed, the time factor extracting portion 9 creates a combined day factor in accordance with a condition for combining and adds the combined day factor to the time factor mother group. For example, the category "day of the week" is set so as to include a combination of up to three consecutive day factors, and therefore, for example, with respect to all combinations of two and three consecutive days of the week, a combined day factor of two consecutive days such as "Saturday and Sunday" and a combined day factor of three consecutive days such as "Saturday, Sunday and Monday" are created.

Moreover, next, by referring to the data on whether or not day factors are combined into a principal component, the time factor extracting portion 9 judges whether or not day factors should be combined into a principal component in each of the categories. In the case where the combining into a principal component is performed, the time factor extracting portion 9 performs principal component analysis with respect to day factors included in a category, creates a combined day factor corresponding to each principal component, and adds the combined day factor to the time factor mother group.

FIG. 12 is a diagram showing an example of mother group data 26 representing a time factor mother group created by the time factor extracting portion 9 based on the mother group extraction condition table 25 shown in FIG. 11. In the mother group data 26, an ID of an extraction target day factor, a category, a day factor, a day factor value are recorded for each day factor included in a time factor mother group. The ID of an extraction target day factor is an identifier for identifying a day factor included in the time factor mother group. Examples of day factors of the mother group data 26 also include combined day factors such as "Monday and Tuesday." Similarly to the day factor data shown in FIG. 3, the day factor is data that indicates a day corresponding to a day factor as "1", and each of the other days as "0".

The creation of a time factor mother group is not limited to the case of the creation based on prerecorded data such as the above-described mother group extraction condition table 25. For example, the time factor extracting portion 9 may perform the creation in accordance with an instruction from a user such as, for example, a Web site manager, which is accepted via a user interface. Similarly, the creation of an extraction list, which will be described layer, may also be performed in accordance with an instruction from a user.

When the time factor mother group is created in the above-described manner, the time factor extracting portion 9 creates an extraction list that is data showing combinations of day factors to be extracted from the time factor mother group (Op 303). For example, the time factor extracting portion 9 repeatedly performs processing of selecting a combination of day factors from the time factor mother group recorded in the mother group data 26 and adding data showing the selected combination of day factors to an extraction list, thereby recording a plurality of combinations of day factors on the extraction list.

For example, the time factor extracting portion 9 can perform processing of selecting a given number of day factors from a time factor mother group with respect to every combination pattern of day factors. Thus, all the patterns of combinations of the given number of day factors that can be selected from the time factor mother group are recorded on an extraction list. Further, in the above-described repeated selection processing, the time factor extracting portion 9 may select a significant day factor (for example, a day factor in the category "day of the week") every time the processing is performed. The procedure for creating an extraction list is not limited to this case. For example, the time factor extracting portion 9 can record a plurality of combinations of day factors on an extraction list by repeatedly performing processing of randomly selecting only a given number of day factors. For example, data showing a procedure for creating an extraction list as described above can be recorded beforehand in the extraction procedure recording potion 12 as extraction procedure data.

FIG. 13 is a diagram showing an extraction list table 27 as an example of data representing an extraction list created by the time factor extracting portion 9. In the extraction list table 27, a list number and data showing a combination of day factors corresponding to each list number are recorded. For example, a combination of day factors is represented by a combination of extraction candidate day factors IDs recorded in the mother group data 26.

When an extraction list is created in the above-described manner, using each combination of day factors recorded on the extraction list, the time factor feature generating portion 13 generates data showing a time factor feature. In the flow chart shown in FIG. 10, below-described processings in Op 305 to Op 309 are executed with respect to each combination of day factors recorded on the extraction list.

First, the time factor extracting portion 9 initializes a variable n to "0" (Op 304). The time factor extracting portion 9 adds 1 to the variable n (Op 305), and generates a day factor matrix D (n) with respect to a $n^{th}$ combination of day factors in the extraction list table 27 (Op 306).

For example, where n=1, the time factor extracting portion 9 generates a day factor matrix D (1) with respect to a $1^{st}$ combination of day factors in the extraction list table 27 (combination of day factors bearing a list number "1"). The day factor matrix D (1) is, for example, a matrix in which a day factor value of a day factor corresponding to each of the extraction candidate day factors IDs "0001" to "0009", "0011" to "0021", . . . is listed in each column.

The time factor feature generating portion 13 calculates a coefficient matrix A (n) such that a square of an error b has a minimum value in an equation (6) below in which the day factor matrix D (n) generated in Op 306 and a principal component score matrix T generated by the variation data generating portion 8 are used as an explaining variable and an explained variable, respectively (Op 307).

$$T = D(n) \cdot A(n) + b \quad (6)$$

In the above equation (6), the principal component score matrix T is the same as the principal component score matrix T in the above equation (4) and is a matrix representing variations in degree of use of a Web site.

The evaluating portion 14 decides whether or not there is a correlation between each pair of day factors included in the day factor matrix D (n) (Op 308). The evaluation portion 14 can decide whether or not there is a correlation by the use of a known statistical method. The result of the judgment whether or not there is a correlation between each pair of day factors can be used as a reference when the time factor extracting portion 9 selects a combination of day factors from a time factor mother group and creates an extraction list.

Figure 14:
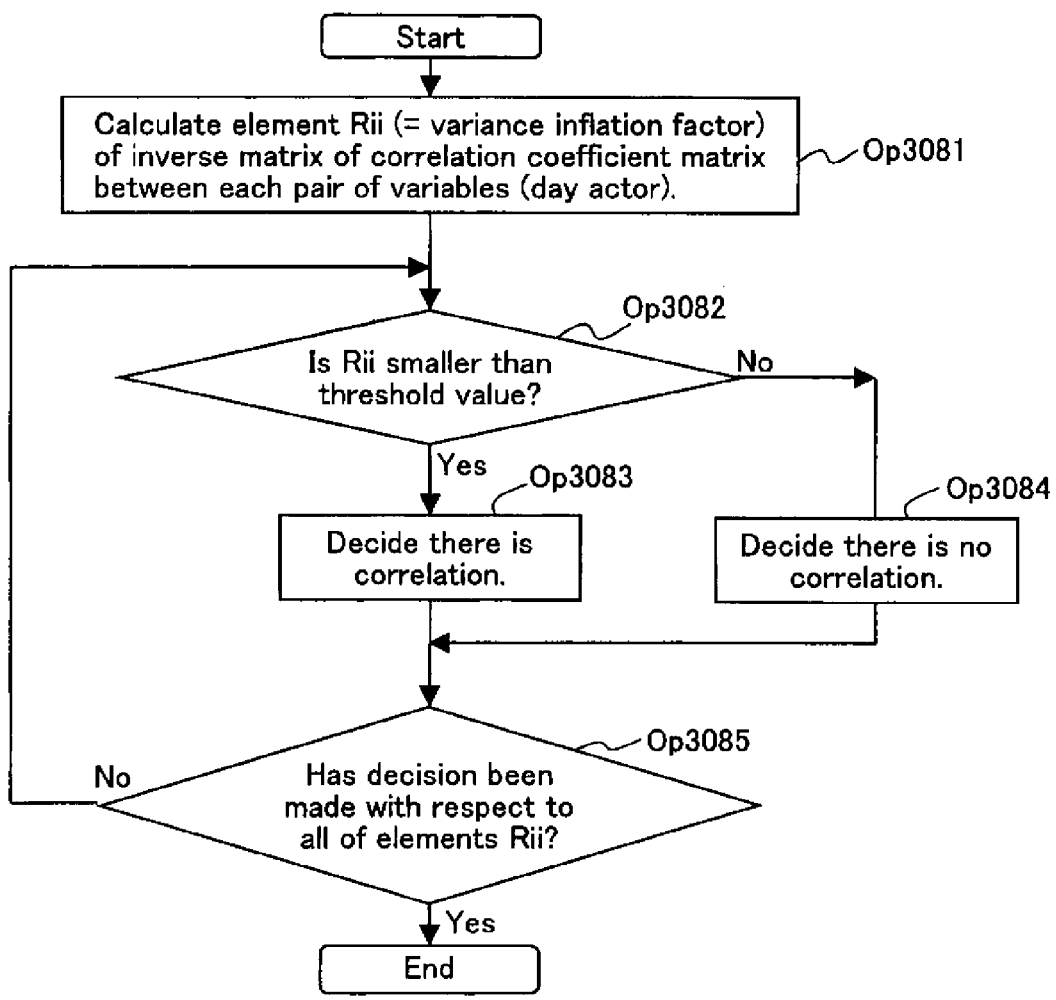
FIG. 14 is a flow chart showing an example of processing of deciding whether or not there is a correlation between a day factor matrix D (n) and a principal component score matrix T.

FIG. 14 is a flow chart showing an example of processing of deciding whether or not there is a correlation between the day factor matrix D (n) and the principal component score matrix T. In the example shown in FIG. 14, the evaluating portion 14 first calculates an element Rii (=variance inflation factor) of an inverse matrix of a correlation coefficient matrix between each pair of day factors included in the day factor matrix D (n) (Op 3081). The evaluating portion 14 judges whether or not one element from among the elements Rii is smaller than a threshold value (Op 3082). In the case where the one element is smaller than the threshold value ("Yes" in Op 3082), the evaluating portion 14 decides that there is a correlation between the pair of day factors corresponding to the one element (Op 3083). In the case where the one element is not smaller than the threshold value ("No" in Op 3082), the evaluating portion 14 decides that there is no correlation between the pair of day factors corresponding to the one element (Op 3084). The evaluating portion 14 performs the processings in Op 3082 to Op 3084 with respect to each of all the elements Rii.

As described above, the processing shown in FIG. 14 specifies a pair of day factors that are included in the day factor matrix D (n) and have a correlation between them. A method of deciding whether or not a correlation is not limited to the example shown in FIG. 14. For example, the evaluating portion 14 can determine a value showing uniqueness (for example, t test value) of a day factor included in the day factor matrix D (n), and judge whether or not there is a correlation based on whether or not that value exceeds a threshold value.

Moreover, the evaluating portion 14 calculates forecast precision of a forecast value of a variation in degree of use of a Web site calculated using D (n) and A (n) (Op 309 in FIG. 10). For example, using D (n) and A (n), the evaluating portion 14 calculates forecast data for a time period with respect to which actual measured data has been obtained, and compares the actual measured data with the forecast data, thereby allowing data showing forecast precision to be obtained. That is, the data showing forecast precision is data showing the degree of suitability of D (n) and A (n) to use for forecasting.

Figures 15, 16:
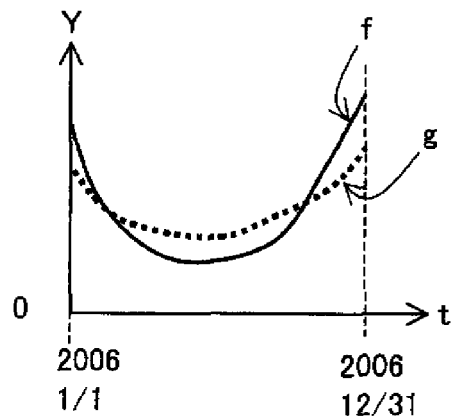
FIG. 15 is a diagram in which forecast values of variations represented by a matrix $T_{2007}$ and actual measured values of variations represented by performance data are plotted on a graph.
FIG. 16 is a diagram showing time factor feature data as an example of data showing a time factor feature.

Now, as an example, the following describes a case where D (n) and A (n) are data calculated regarding variations in degree of use of a Web site in the period of time between Jan. 1, 2006 and Dec. 31, 2006, and performance data showing variations in degree of use of the Web site in the period of time between Jan. 1, 2007 and Dec. 31, 2007 has been obtained. In this case, the evaluating portion 14 creates a matrix $D_{2007}$ representing day factors in the period of time between Jan. 1, 2007 and Dec. 31, 2007 with respect to each day factor included in D (n). Using this matrix $D_{2007}$, according to the above equation (5), a matrix $T_{2007}$ representing forecast values of variations in degree of use of the Web site in the period of time between Jan. 1, 2007 and Dec. 31, 2007 can be calculated. The forecast values of variations in degree of use of the Web site represented by this matrix $T_{2007}$ are compared with the performance data. FIG. 15 is a diagram in which forecast values of variations represented by the matrix $T_{2007}$ and actual measured values of variations represented by the performance data are plotted on a graph where the horizontal axis indicates a time t and the vertical axis indicates the degree of use Y. In FIG. 15, a curve f indicated by a solid line represents a variation in actual measured value and a curve g indicated by a broken line represents a variation in forecast value. For example, the evaluating portion 14 calculates an indicator H using an area $S_f$ between a straight line Y=0 and the curve f and an area $S_{fg}$ between the curve f and the curve g according to an equation (7) below.

$$H = 1 - (S_{fg}/S_f) \quad (7)$$

The indicator H is an indicator that indicates how approximate a forecast value is to an actual measured value and can be referred to as an average explanation rate. The average explanation rate has a value of 0 to 1 and thus is used suitably as an indicator. The evaluating portion 14 can record on a recording medium, a value of this indicator H as data showing forecast precision.

A method of calculating data showing forecast precision is not limited to the above-described example. For example, the evaluating portion 14 may calculate an indicator showing how simple a calculation performed for forecasting is (for example, an information amount standard), instead of an indicator indicating how approximate a forecast value is to a performance value such as the above-described indicator H. This is because there is also a conception that the simpler a calculation executed for forecasting is, the more excellent forecast distribution it provides.

The time factor extracting portion 9 judges whether or not processing is completed with respect to all the combinations of day factors included in the extraction list shown by the extraction list table 27 (Op 310 (see FIG. 10)). In the case where processing is not completed with respect to all the combinations of day factors included in the extraction list (in the case where "No" is given in Op 310), again, the processings in Op 305 to Op 309 are performed repeatedly.

Thus, the above-described processings in Op 305 to Op 309 are executed with respect to all combinations of day factors on an extraction list shown by the extraction list table 27. As a result, with respect to each of combinations of day factors on an extraction list, data showing D (n), A (n) and forecast precision can be obtained.

The time factor feature generating portion 13 selects an optimum pair of D (n) and A (n) among the pairs with respect to all the combinations of day factors on the extraction list. For example, the time factor feature generating portion 13 can select as the optimum pair, a pair whose forecast precision is found to be the highest in Op 309. The selected optimum pair of D (n) and A (n) is recorded in the time factor feature recording portion 15 as data showing a time factor feature of variations in degree of use of a Web site shown by variation data. A method of selecting an optimum pair is not limited to the above-described example.

FIG. 16 is a diagram showing time factor feature data 28 as an example of data showing a time factor feature recorded in the time factor feature recording potion 15. In the time factor feature data 28, a target range of analysis, combinations of day factors (eigen day factor group) and a coefficient matrix are recorded for each analysis ID. A target of analysis is, for example, data showing a target regarding a time factor feature, and examples thereof include a target Web site and a target behavior pattern. The combinations of day factors are data showing a day factor group corresponding to the above-described optimum D (n) and are referred to as an eigen day factor group. The coefficient matrix is the above-described optimum A (n).

As described above, by the processing shown in FIG. 10, combinations of day factors for precisely expressing variations in degree of use of a target Web site shown by variation data (a day factor group (eigen day factor group) corresponding to D (n)) and coefficients (A (n)) with respect to the day factors can be obtained. Using these values, user attribute analysis that specifies an attribute of a user of a Web site (Op 4 in FIG. 4) and processing of determining optimum timing for inserting an advertisement to a Web site and inserting the advertisement at the optimum timing (Op 5 in FIG. 4) are performed.

(Specific Example of Processing in which the User Analyzing Portion 16 Specifies a User Attribute (Op 4))

Figure 17:
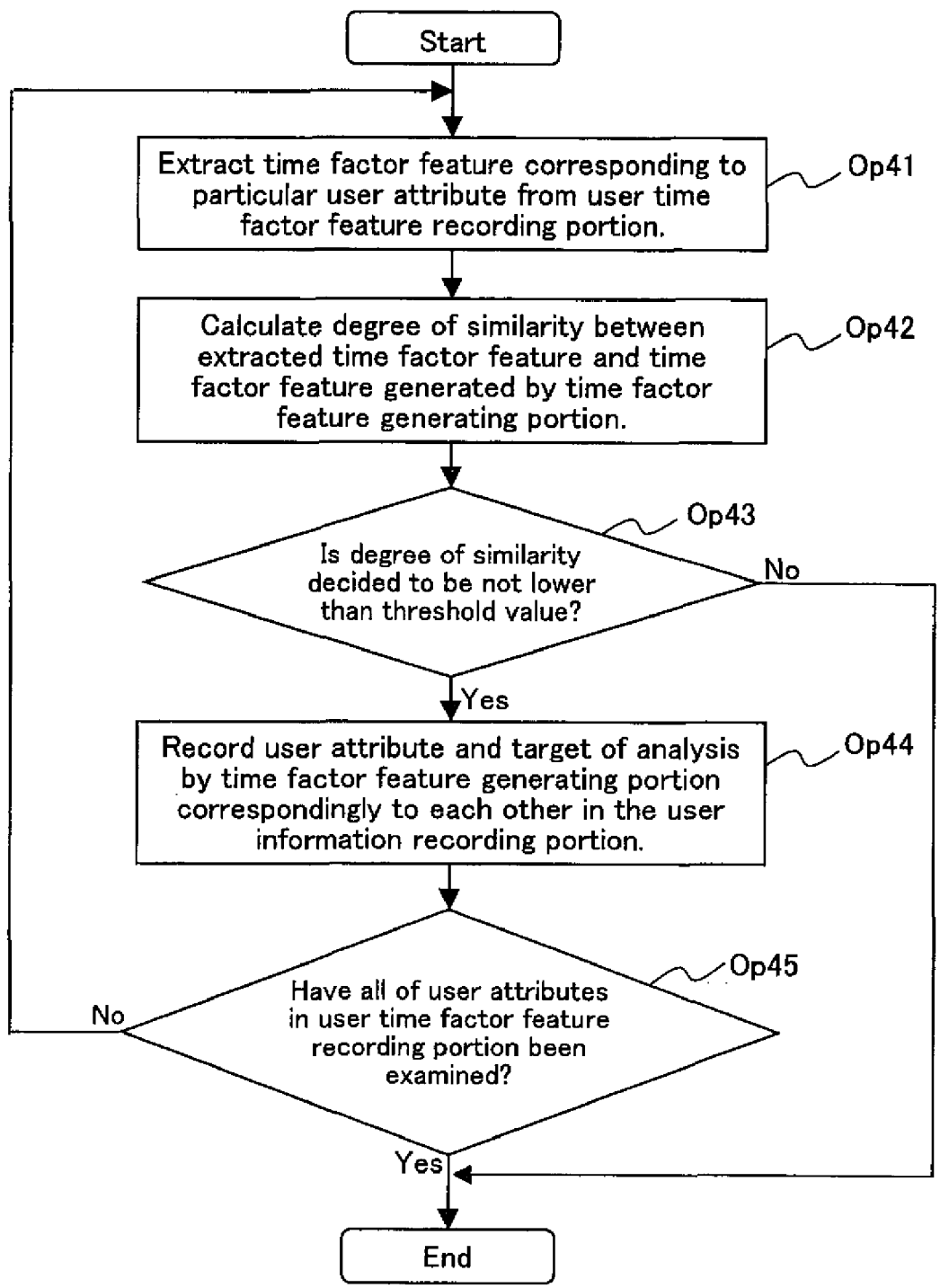
FIG. 17 is a flow chart showing a specific example of processing in which a user analyzing portion generates transition data.

FIG. 17 is a flow chart showing a specific example of processing in which the user analyzing portion 16 generates transition data (see Op 4 in FIG. 4). As an example, the following describes processing in which using data of the analysis ID="1" in the time factor feature data 28 shown in FIG. 16, an attribute of a user who has used a Web site is analyzed. As shown in FIG. 17, the user analyzing portion 16 extracts data showing a time factor feature corresponding to a particular user attribute from the user time factor feature recording portion 17 (Op 41).

In the user time factor feature recording portion 17, for example, the pair of the eigen day factor group and the coefficient matrix shown in FIG. 16 are recorded with respect to each of various user attributes. The user attribute is, for example, a user's predisposition, diathesis, custom, habit, organization to which he/she belongs, social status or the like. Specific examples of data showing a user attribute include data representing, or a combination of data representing an age, a gender, an occupation, a job title, an annual income, a residential area, a place of work, a school, a place of employment, a hobby, or a family structure. With respect to each of the above-described various user attributes, an eigen day factor group that has been analyzed in the past and a coefficient matrix are recorded in the user time factor feature recording portion 17. In Op 41, the user analyzing portion 16 selects one certain user attribute and extracts an eigen day factor group and a coefficient matrix that correspond thereto.

Next, the user analyzing portion 16 calculates the degree of similarity between the pair of the eigen day factor group and the coefficient matrix extracted in Op 41 and the pair of the eigen day factor group and the coefficient matrix that correspond to the analysis ID="1" in the time factor feature data 28 (Op 42). For example, the user analyzing portion 16 can use as the degree of similarity between the eigen day factor group N1 and the eigen day factor group N2, the number of day factors included in both of N1 and N2. Further, as another example, using a pair of a day factor matrix D (N1) that is based on N1 and obtained with regard to a predetermined time period and a coefficient matrix A1 with respect to N1 and a pair of a day factor matrix D (N2) that is based on N2 and obtained with regard to a predetermined time period and a coefficient matrix A2 with respect to N2, the degree of similarity between N1 and N2 can be determined. In this case, for example, the user analyzing portion 16 calculates the matrix D1=(N1)·A1 and the matrix D2=D (N2)·A2. Then, the user analyzing portion 16 calculates a correlation coefficient between an element of the matrix D1 and an element of the matrix D2, and can use as the degree of similarity, a ratio of values exceeding a threshold value to values of the correlation coefficient between each pair of the elements. A method of calculating the degree of similarity is not limited to the above-described example.

When the degree of similarly is not lower than the threshold value ("Yes" in Op 43), the user attribute and the data of the analysis ID="1" in the time factor feature data 28 are recorded correspondingly to each other in the user information recording portion 18 (Op 44). The processings in Op 41 to Op 44 are performed repeatedly until the processings are completed with respect to all the user attributes recorded in the user time factor feature recording portion 17 (until "Yes" is given as a result of judgment in Op 45).

For example, in the case where the degree of similarity between the pair of an eigen day factor attribute and a coefficient matrix that correspond to the analysis ID="1" and the pair of an eigen day factor attribute and a coefficient matrix that correspond to a user attribute="student" is not lower than the threshold value, it is found as information that a user attribute corresponding to a time factor feature similar to a time factor feature of "a behavior to use a service of a mail-order site of Company A" that is an analysis target of the analysis ID="1" is "student." Thus, it becomes possible to presume that users who exhibit "a behavior to use a service of a mail-order site of Company A" are mostly "students."

As described above, by the processing shown in FIG. 17, for example, data showing a relationship between a behavior to use a service of a Web site and a user attribute is recorded in the user information recording portion 18. Further, similarly, data showing a relationship between each of a behavior to access an advertisement of a Web site and a reaction behavior to an advertisement and a user attribute of a user who may exhibit such a behavior can also be recorded. Thus, for example, it becomes easy to decide what type of users has been affected by an advertisement provided by a Web site. This effect has greater significance under the current circumstances in which the enactment of the Personal Information Protection Law has made it difficult to use personal profiles of users (Specific Example of Processing in which the Advertisement Inserting Portion 19 Inserts an Advertisement (Op 5))

Figure 18:
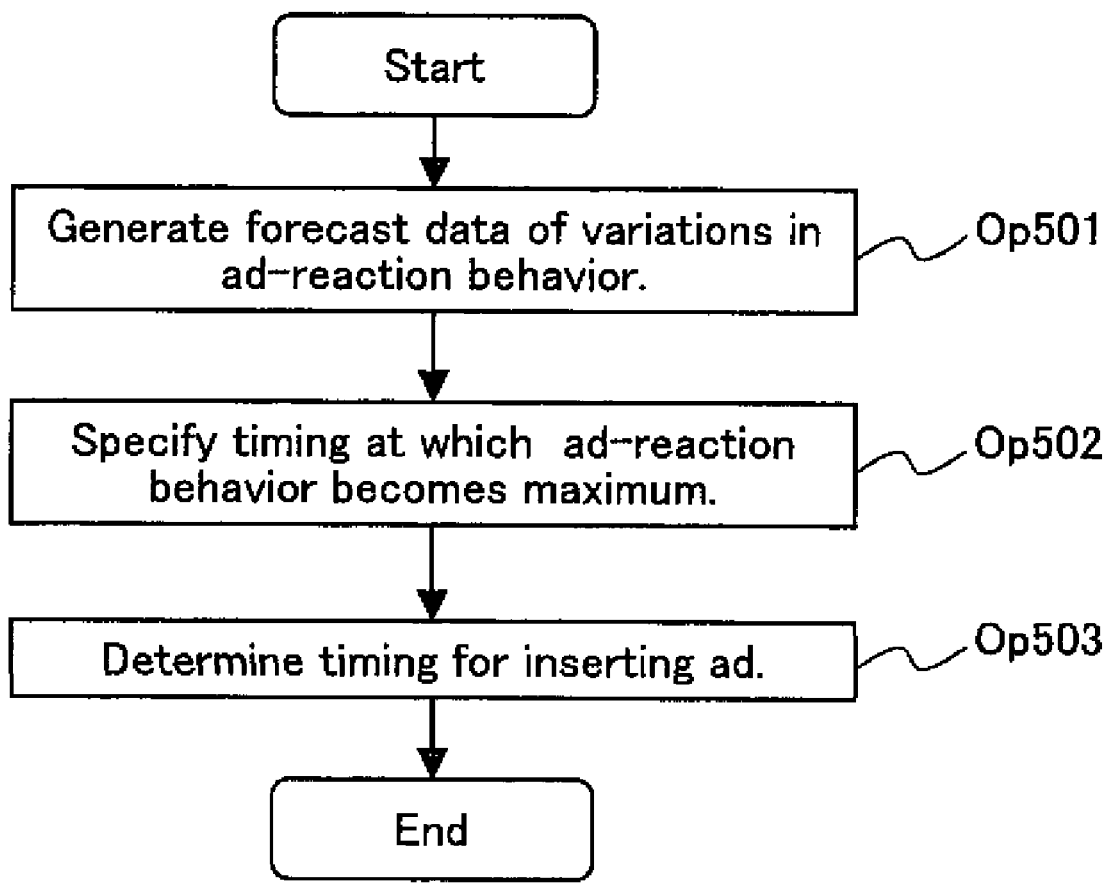
FIG. 18 is a flow chart showing an example of processing in which an advertisement inserting portion determines timing for inserting an advertisement.

FIG. 18 is a flow chart showing an example of processing in which the advertisement inserting portion 19 determines timing for inserting an advertisement. As an example, the following describes processing in which in the case where the time factor feature generating portion 13 generates data showing a time factor feature of a user's advertisement-reaction behavior to access an advertisement on a certain Web site and use a service regarding the advertisement, the advertisement inserting portion 19 determines timing for inserting the advertisement of the service to another Web site.

First, using the data showing a time factor feature generated by the time factor feature generating portion 13, the advertisement inserting portion 19 generates forecast data on an advertisement-reaction behavior to an advertisement and the service of the Web site (Op 501).

For example, the following describes a case where the data showing a time factor feature is composed of an eigen day factor group and a coefficient matrix. Based on the eigen day factor group, the advertisement inserting portion 19 generates a day factor matrix with regard to a time period with respect to which forecasting is performed. For example, in the case where the time period with respect to which forecasting is performed is between Jan. 1, 2007 and Dec. 31, 2007, with respect to each day factor included in the eigen day factor group, the advertisement inserting portion 19 generates day factor values that are a column of values such that a corresponding day in the period of time between Jan. 1, 2007 and Dec. 31, 2007 is indicated as "1" and each of the other days is indicated as "0". A matrix is used as a day factor matrix $D_f$ used for forecasting, in which one column is constituted by day factor values corresponding to one day factor and listed with respect to each of all the day factors included in the eigen day factor group. For example, using this day factor matrix $D_f$ and a coefficient matrix, the advertisement inserting portion 19 can calculate a matrix $Y_f$ showing forecast values of the number of occurrences of an advertisement-reaction behavior to a Web site in the period of time between Jan. 1, 2007 and Dec. 31, 2007 according to an equation (8) below.

$$Y_f = D_f \cdot A \cdot P^T + e \cdot x \quad (8)$$

In the above equation (8), as for $P^T$ and $e \cdot x$, the same applies as described with regard to the above equation (5).

Next, by referring to a forecast value shown by the matrix $Y_f$, the advertisement inserting portion 19 specifies timing at which the number of occurrences of an advertisement-reaction behavior to a Web site becomes the maximum (Op 502). Then, based on the timing at which the number of occurrences of the advertisement-reaction behavior to the Web site becomes the maximum, the advertisement inserting portion 19 determines advertisement inserting timing (Op 503). For example, the advertisement inserting portion 19 can determine as advertisement inserting timing, timing including a given time period before and after the timing at which the number becomes the maximum. The advertisement inserting portion 19 executes processing of inserting an advertisement to the Web server 2 at the determined timing. Thus, it becomes possible to insert an advertisement in a timely manner.

Further, a method of determining advertisement inserting timing is not limited to this example. For example, in the case where timing at which a forecast value of the number of occurrences of an advertisement-reaction behavior to a certain service 1 provided on a Web site becomes the maximum coincides with timing at which a forecast value of the number of occurrences of an advertisement-reaction behavior to another service becomes the maximum, the advertisement inserting portion 19 determines timing for inserting a guiding advertisement so that a peak of the occurrence of the advertisement-reaction behavior to the service 1 does not coincide with a peak of the occurrence of the advertisement-reaction behavior to the another service. For example, in the case where forecast values regarding the service 1 and the another service both become the maximum on Wednesday, the advertisement inserting portion 19 may determine advertisement inserting timing so that an advertisement of the service 1 and an advertisement of the another service are posted on the Web site in turn every week. Thus, for example, the advertisement of the service 1 is inserted on Wednesday this week, and the advertisement of the another service is inserted on Wednesday next. This allows users to avoid being suffered from an access rush, thereby realizing a guiding advertisement that improves customer satisfaction.

Further, using the result of analysis by the user analyzing portion 16, the advertisement inserting portion 19 can extract, for example, a behavior pattern of a user group to which an advertisement on a certain Web site has appealed, a behavior pattern of said user group at an advertisement non-running time, a behavior pattern of a behavior accompanying the behavior pattern of said user group at the advertisement non-running time. Thus, it becomes possible to detect a common feature of other behaviors of users sensitive to merchandise advertised in the advertisement and use the common feature in developing a more efficient advertisement.

For example, it is assumed that analysis by the user analyzing portion 16 specifies a user group α having the same time factor feature (for example, "Sunday") as the time factor feature of an advertisement-reaction behavior to an advertisement on a certain Web site A. It is also assumed that this user group α is recorded as data showing not only said advertisement-reaction behavior but also a behavior pattern of the user group α to return after making a tour of other Web sites B and C as well. In that case, the advertisement inserting portion 19 can extract a particular behavior pattern X of this user group α in a service location B (for example, a behavior pattern in which after roaming around in the site, a user finally make a purchase). Moreover, the advertisement inserting portion 19 can analyze the possibility that this behavior pattern X occurs a given number of times or more at the Web site A even at a time at which the advertisement is not posted on the Web site (non-running time). Thus, it is possible to obtain data showing a status of use of the Web site A by the user group α at an advertisement non-running time.

Furthermore, if the user group α exhibiting the behavior pattern X at said advertisement non-running time is found to exhibit another behavior pattern Y at the same time as the behavior pattern X, the advertisement inserting portion 19 may record the behavior pattern Y as another behavior pattern characterizing the user group α. The advertisement inserting portion 19 can analyze a status of use by the user group α by watching this behavior pattern Y.

In FIG. 18, processing of determining advertisement inserting timing was shown as an example. Similarly, timing at which an event realized on a Web site occurs such as service providing timing, campaign conducting timing or the like can be determined according to a time factor feature of a user.

Second Embodiment

This embodiment is a modification example of the operation shown in FIG. 10 with regard to the above-described first embodiment. In this modification example, processing in the operation shown in FIG. 10, in which the time factor extracting portion 9 extracts a time factor and the time factor feature generating portion 13 generates data showing a time factor feature is performed with respect to the principal component score matrix T generated by the variation data generating portion 8. In this embodiment, the operation shown in FIG. 10 is performed for each principal component (feature base) included in the principal component score matrix T.

Figure 19:
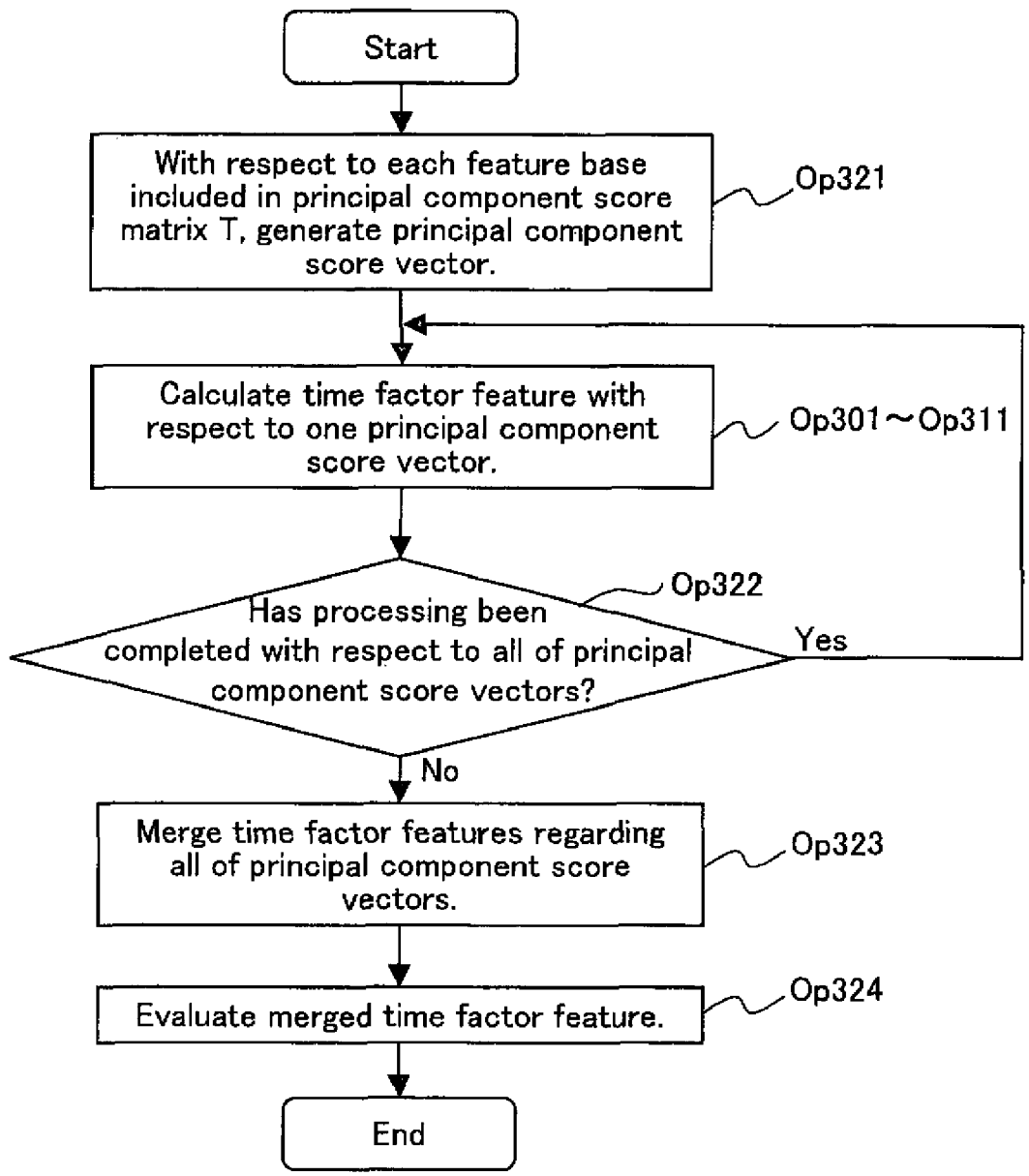
FIG. 19 is a flow chart showing a specific example of processing in a second embodiment, in which the time factor extracting portion extracts a time factor, and the time factor feature generating portion generates data showing a time factor feature.

FIG. 19 is a flow chart showing a specific example of processing in this embodiment, in which the time factor extracting portion 9 extracts a time factor, and the time factor feature generating portion 13 generates data showing a time factor feature. The processing shown in FIG. 19 is processing corresponding to Op 3 in FIG. 4.

As shown in FIG. 19, first, with respect to p feature bases included in the principal component score matrix T generated by the variation data generating portion 8, the time factor extracting portion 9 generates p vectors $t_k$ representing principal component scores (Op 321). Herein, as described above, the principal component score matrix T is a matrix calculated in the variation data generating portion 8 according to the equation (2). Each column of the matrix T forms a vector $t_k$ representing a principal component score.

Next, with respect to one of the principal component score vectors $t_k$ generated in Op 321, the time factor extracting portion 9 and the time factor feature generating portion 13 perform the processings in Op 301 to Op 311. Then, the processings in Op 301 to Op 311 are performed repeatedly until the processings are completed with respect to all of the p feature bases included in the principal component score matrix T ("Yes" is given as a result of judgment in Op 322). Thus, p pairs, each of which is composed of a day factor matrix $D_k$ and a coefficient matrix $A_k$ with respect thereto and that correspond respectively to the p feature bases are calculated.

In this embodiment, the above equation (6) used in Op 307 is expressed by an equation (9) below.

$$t_k = D_k(n) \cdot A_k(n) + b \qquad (9)$$

That is, the matrix T and the coefficient matrix A in the above equation (6) are the vector $t_k$ and a coefficient vector $A_k$ (n), respectively. The day factor matrix $D_k$ (n) is a day factor matrix generated with respect to each feature base.

When the p pairs of the day factor matrices $D_k$ and the coefficient vectors $A_k$ with respect thereto are calculated so as to correspond respectively to the feature bases, the time factor feature generating portion 13 merges the p pairs of the day factor matrices $D_k$ and the coefficient vectors $A_k$ with respect thereto thereby to generate one pair of a merged day factor matrix $D_G$ and a coefficient vector $A_G$ with respect thereto. For example, the time factor feature generating portion 13 calculates a weighed average based on a value of a contribution rate of each feature base with respect to each of the p pairs of the day factor matrices $D_k$ and the coefficient vectors $A_k$ with respect thereto, thereby allowing the merged day factor matrix $D_G$ and the coefficient vector $A_G$ with respect thereto to be generated. When day factor and a coefficient vector with respect thereto that correspond to such a merged day factor matrix are used for a calculation of a forecast value, it becomes possible to perform high-precision forecasting based on distinctive day factors.

Figure 20:
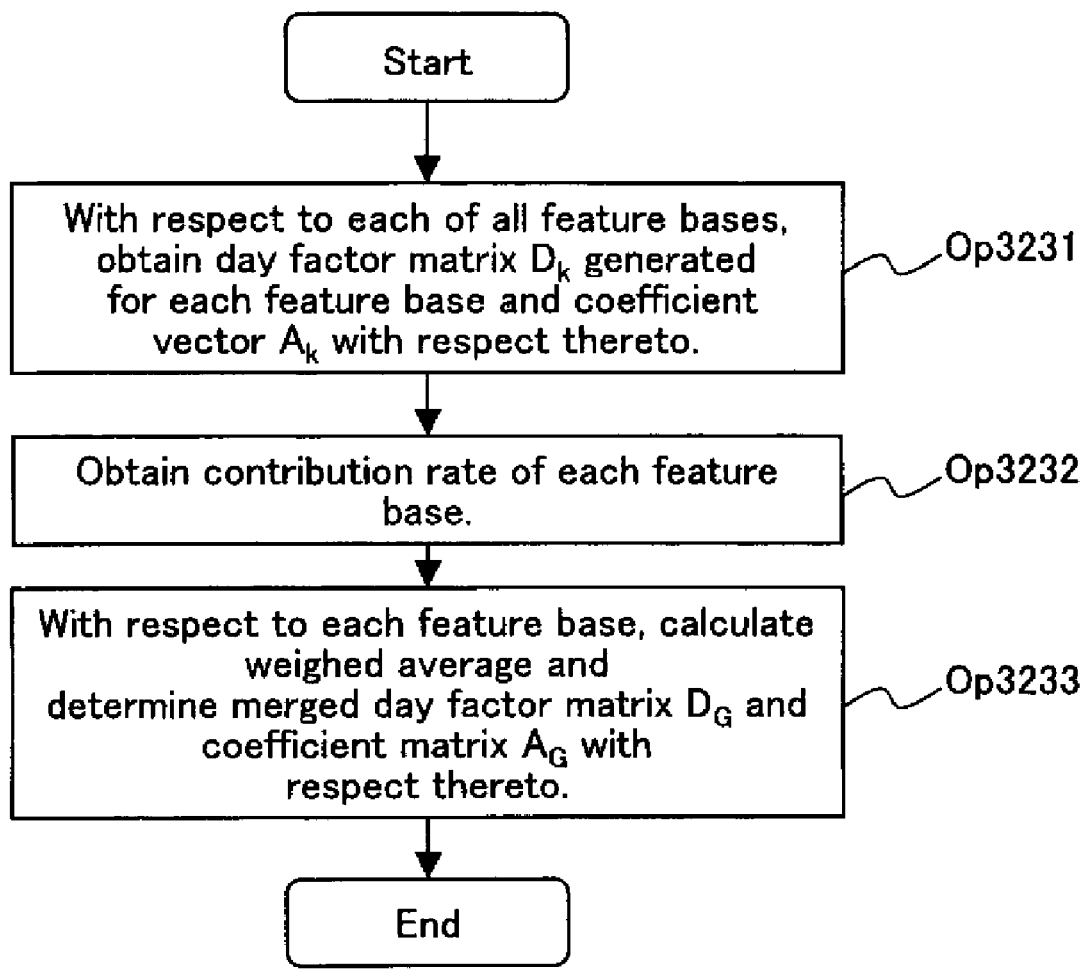
FIG. 20 is a flow chart showing an example of processing of merging pairs, each of which is composed of a day factor matrix $D_k$ and a coefficient matrix $A_k$ with respect thereto and corresponds to each feature base.

FIG. 20 is a flow chart showing an example of processing of merging pairs, each of which is composed of the day factor matrix $D_k$ and the coefficient matrix $A_k$ with respect thereto and corresponds to each feature base. A method of merging these is not limited to the example shown in FIG. 20. In the example shown in FIG. 20, first, the time factor feature generating portion 13 obtains all (p) pairs, each of which is composed of a day factor matrix $D_k$ and a coefficient vector $A_k$ with respect thereto and that correspond respectively to p feature bases (Op 3231). Further, the time factor feature generating portion 13 also obtains a contribution rate $r_k$ of each of the p feature bases (Op 3232). Then, with respect to each of the p pairs of the day factor matrices $D_k$ and the coefficient vectors $A_k$ with respect thereto, the time factor feature generating portion 13 determines a weighed average using the obtained contribution rate $r_k$, and calculates the merged day factor matrix $D_G$ and the coefficient vector $A_G$ with respect thereto (Op 3233). The merged day factor matrix $D_G$ and the coefficient vector $A_G$ with respect thereto are calculated according to, for example, equations (10) and (11) below.

$$D_G = \Sigma(r_k \cdot D_k)/k \qquad (10)$$

$$A_G = \Sigma(r_k \cdot A_k) \qquad (11)$$

When the merged day factor matrix $D_G$ and the coefficient vector $A_G$ with respect thereto are calculated as described above, the evaluating portion 14 calculates forecast precision of a forecast value calculated using these (Op 324). A calculation of forecast precision is performed in the same manner as in the above-described calculation example, and duplicate description thereof is thus omitted. In the case where the forecast precision calculated by the evaluating portion 14 is not more than a threshold value, the time factor feature generating portion 13 may execute the processing shown in FIG. 20 again with a condition for extracting time factors changed, and repeatedly perform processing of determining the merged day factor matrix $D_G$ and the coefficient vector $A_G$ with respect thereto.

Furthermore, with respect to the same principal component score matrix T representing variations in degree of use of a Web site, both the processing shown in FIG. 20 and the processing that is shown in FIG. 10 and described with regard to the first embodiment are executed by the time factor extracting portion 9 and the time factor feature generating portion 13, and a calculation result with higher forecast precision can be adopted as data showing a time factor feature, which is to be recorded in the time factor feature recording portion 15.

Furthermore, in the processing shown in FIG. 20, processing of merging the day factor matrices $D_k$ and the coefficient vectors $A_k$ with respect thereto that correspond respectively to the feature bases (Op 3233) does not necessarily need to be executed. For example, the time factor feature generating portion 13 may record in the time factor feature recording portion 15, the day factor matrix $D_k$ and the coefficient vector $A_k$ with respect thereto that correspond to each feature base as data showing a time factor feature.

Third Embodiment

This embodiment is a modification example of the operation shown in FIG. 9 with regard to the above-described first embodiment. The operation shown in FIG. 9 is an operation example in which the variation data generating portion 8 generates the principal component score matrix T as variation data. In this embodiment, the variation data generating portion 8 extracts a feature interval showing a distinctive variation and generates a principal component score matrix $T_b$ with respect to said feature interval.

Figure 21:
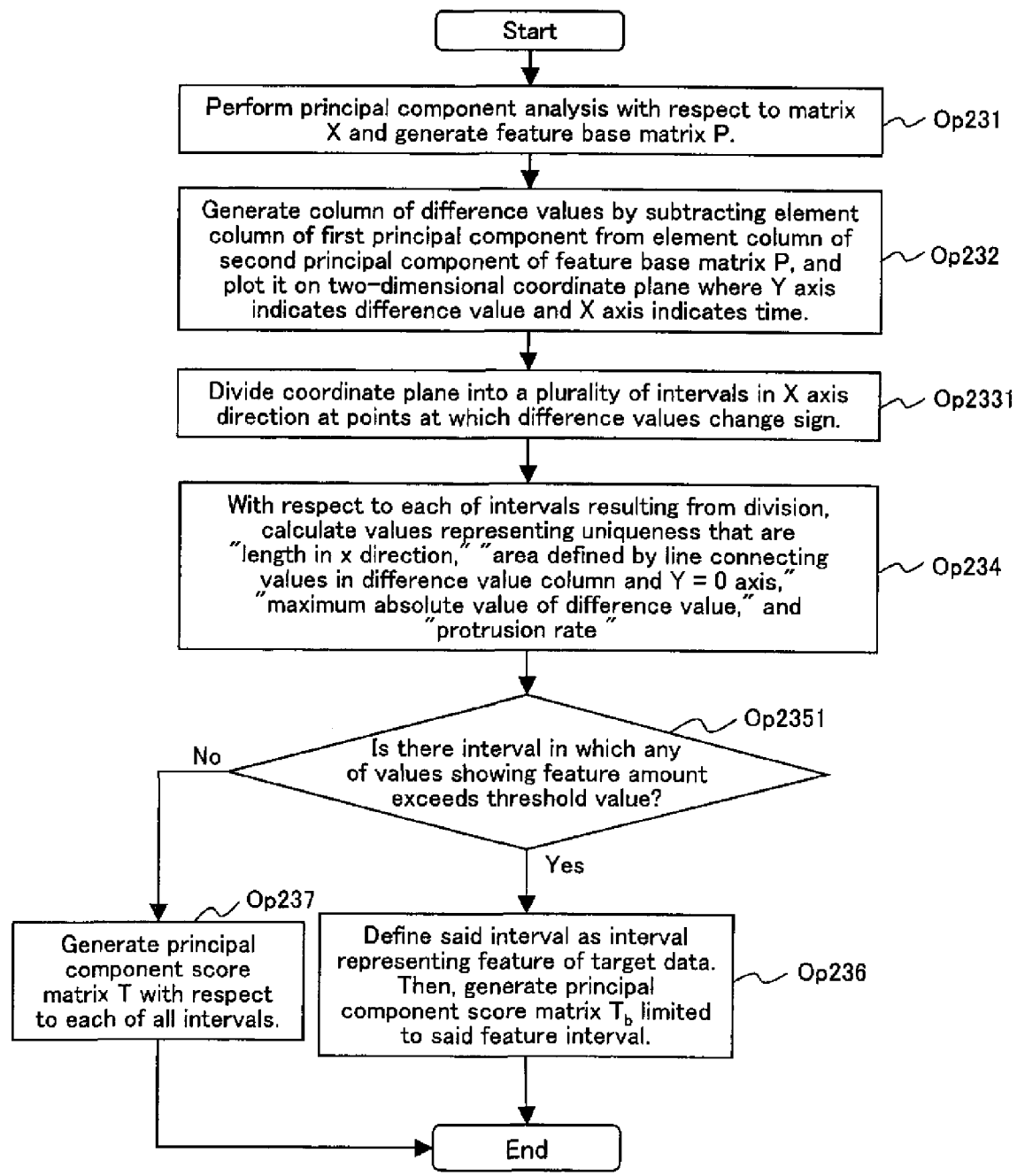
FIG. 21 is a flow chart showing an example of processing in which the variation data generating portion extracts a feature interval showing a distinctive variation and generates a principal component score matrix $T_b$ with respect to said feature interval.

FIG. 21 is a flow chart showing an example of processing in which the variation data generating portion 8 extracts a feature interval showing a distinctive variation and generates the principal component score matrix $T_b$ with respect to said feature interval. The processing shown in FIG. 21 is a modification example of the processing in Op 23 shown in FIG. 9. Herein, as an example, the following describes a case where principal component analysis is performed with respect to the matrix X described with regard to the above-described first embodiment so that a feature interval is extracted, and the principal component score matrix $T_b$ with respect to said feature interval is generated.

In the processing shown in FIG. 21, first, the variation data generating portion 8 performs principal component analysis with respect to the matrix X and generates the feature base matrix P (M×p matrix) (Op 231). A specific example of processing of generating the feature base matrix P (M×p matrix) was described earlier. Each column of the feature base matrix P is composed of M elements that are values showing variations in degree of use of a Web site in one day and are listed in the order of transition with time.

Next, the variation data generating portion 8 generates a difference value by subtracting an element column of a first principal component (column of a principal component whose contribution rate is the highest) from an element column of a second principal component (column of a principal component whose contribution rate is the second highest) of the feature base matrix P, and plots the difference value on a two-dimensional coordinate plane (Op 232).

Figure 22A:
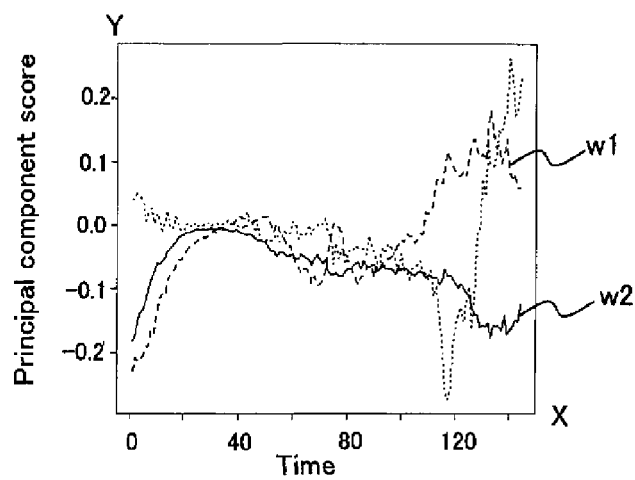
FIG. 22(a) is a diagram showing an example of a graph in which a first principal component and a second principal component of the principal component score matrix T are plotted.
Figure 22B:
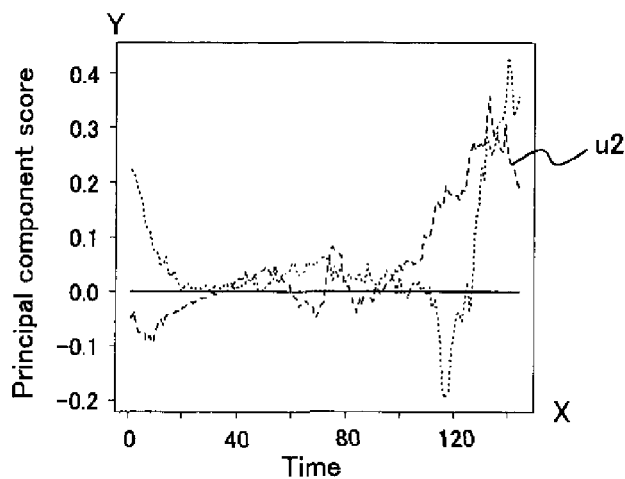
FIG. 22(b) is a diagram showing an example of a graph in which a difference value between the second principal component and the first principal component shown in FIG. 22(a) is plotted.

FIG. 22(a) is a diagram showing an example of a graph in which an element column of a first principal component and an element column of a second principal component of the principal component score matrix T are plotted on a two-dimensional XY coordinate plane. In FIG. 22(a), the Y axis indicates a value of each element, and the X axis indicates a time of the day. In FIG. 22(a), a kinked line w1 is a kinked line connecting elements in the element column of the first principal component, and a kinked line w2 is a kinked line connecting elements in the element column of the second principal component. Each of the kinked lines w1 and w2 represents variations in degree of use of a Web site in one day. FIG. 22(b) is a diagram showing an example of a graph in which a difference value obtained by subtraction of the element column of the first principal component from the element column of the second principal component, which are shown in FIG. 22(a), is plotted on a two-dimensional XY coordinate plane. In FIG. 22(b), the Y axis indicates a difference value, and the X axis indicates a time of the day. In FIG. 22(b), a kinked line u2 is a kinked line connecting difference values of the element column of the second principal component with respect to the element column of the first principal component.

Figure 22C:
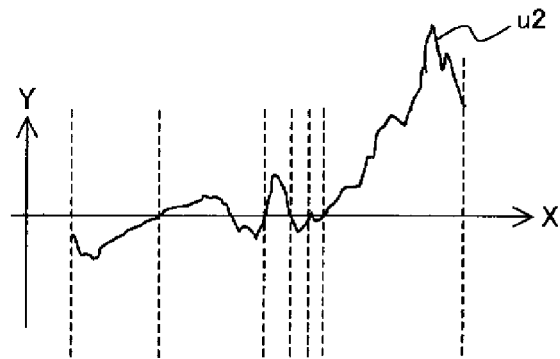
FIG. 22(c) is a diagram showing an example of a case where an X direction shown in FIG. 22(b) is divided into a plurality of intervals.

The variation data generating portion 8 divides the coordinate plane into a plurality of intervals in the X axis direction at points at which difference values change sign (namely, intersection points between an axis where Y=0 and the kinked line u2) (Op 233). Thus, the kinked line u2 showing difference values obtained in one day is divided into a plurality of time frames that correspond to the intervals, respectively. FIG. 22(c) is a diagram showing an example of a case where the coordinate plane shown in FIG. 22(b) is divided into a plurality of intervals in an X direction. As shown in FIG. 22(c), the coordinate plane is divided into a plurality of intervals in the X axis direction by lines (shown by dotted lines) that are parallel to the Y axis and pass through the intersection points between the Y=0 axis and the kinked line u2.

With respect to each interval resulting from the division in Op 233, the variation data generating portion 8 calculates values showing uniqueness (Op 234). Values showing uniqueness of one interval include, for example, the length of the interval in the x direction, an area $S_k$ defined by the kinked line u2 and the Y=0 axis in the interval, a maximum absolute value $UK_{max}$ of a difference value in the interval, and a protrusion rate $TS_k$ of the kinked line u2 in the interval. The protrusion rate $TS_k$ is a value calculated using the above-described $UK_{max}$ and $S_k$ according to an equation (12) below.

$$TS_k = UK_{max}/S_k \quad (12)$$

Figure 22D:
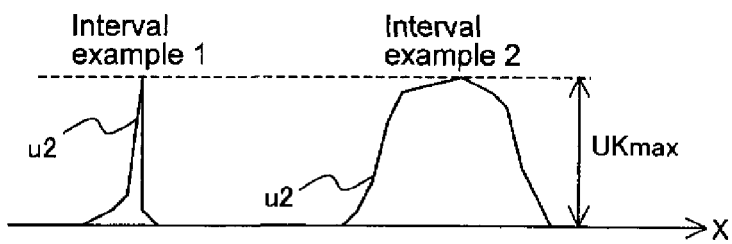
FIG. 22(d) is a diagram showing an example of two intervals that vary in protrusion rate.

FIG. 22(d) is a diagram showing an example of two intervals that vary in protrusion rate. In the example shown in FIG. 22(d), a protrusion rate of an interval 1 is larger than a protrusion rate of an interval 2. This is because of the following reason. That is, the kinked line u2 representing difference values has a shape with an acute angle in the interval 1, and therefore, a ratio of the maximum absolute value $UK_{max}$ of a difference value to an area defined by the kinked line u2 and the Y=0 axis in the interval 1 is higher than in the interval 2.

The variation data generating portion 8 compares the above-described values showing uniqueness, which are calculated with respect to one interval, with respective threshold values, and judges whether or not at least one of the values showing uniqueness exceeds its threshold value. This judgment is performed with respect to each of all the intervals, and if there is an interval in which at least one of the values showing uniqueness exceeds its threshold value (Op 2351), the interval is used as a feature interval. The variation data generating portion 8 extracts principal component scores in the feature interval with respect to each of the p feature bases, and generates the principal component score matrix $T_b$ in which each column is composed of the principal component scores (Op 236). In the case where it is judged in OP 2351 that there is no such interval, the principal component score matrix is generated with respect to each of all the intervals (Op 237).

As described above, by the processing showing in FIG. 21, the variation data generating portion 8 can extract a feature interval and generate the principal component score matrix Tb with respect to the feature interval. A method of extracting a feature time period is not limited to the method shown in FIG. 21. For example, as the values showing uniqueness that are calculated in Op 234, values other than the values described in the above-described example or part of the above-described values may be used.

Fourth Embodiment

In this embodiment, the time factor extracting portion 9 shown in the functional block diagram in FIG. 1 further has a function of performing principal component analysis with respect to a time factor value corresponding to a time factor extracted from the time factor data recording portion 11 thereby to generate a principal component score matrix. Further, the time factor feature generating portion 13 uses a principal component score matrix generated by the time factor extracting portion 9 as an explaining variable to generate data showing a time factor feature.

As a specific example, the following describes an example in which the time factor extracting portion 9 further performs principal component analysis processing with respect to the day factor matrix D (n) created in Op 306 in the flow chart shown in FIG. 10 thereby to perform processing of generating a day factor matrix $D_A$ (n) by compression into a matrix of principal component scores. Thus, in Op 307, the time factor feature generating portion 13 can perform a calculation using the compressed day factor matrix $D_A$ (n), which provides an effect of reducing computational complexity.

Figure 23:
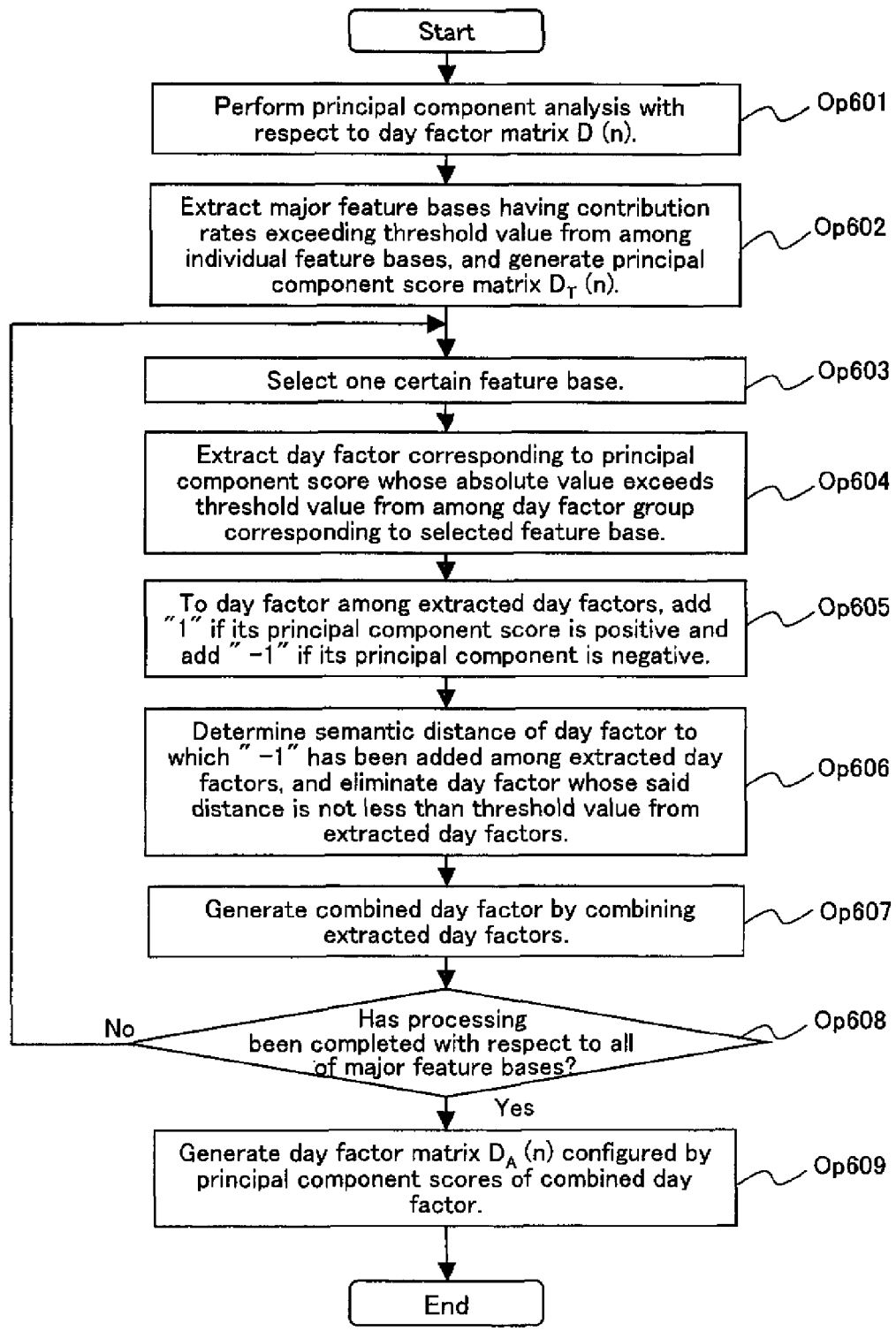
FIG. 23 is a flow chart showing an example of processing in a fourth embodiment, in which the time factor extracting portion compresses a day factor matrix D (n).

FIG. 23 is a flow chart showing an example of processing in this embodiment, in which the time factor extracting portion 9 compresses the day factor matrix D (n). The time factor extracting portion 9 performs principal component analysis with respect to the day factor matrix D (n) and generates a plurality of feature bases and contribution rates (Op 601). The time factor extracting portion 9 extracts feature bases as major feature bases, each of which has a contribution rate exceeding a threshold value, from among the plurality of feature bases. Then, using the major feature bases, the time factor extracting portion 9 generates a principal component score matrix $D_T$ (n) (Op 602). Elements in each column of the principal component score matrix $D_T$ (n) are principal component scores, each of which is listed with respect to each of day factor that correspond to each of the feature bases. The time factor extracting portion 9 selects one feature base from among the major feature bases (Op 603). Then, the time factor extracting portion 9 extracts a day factor corresponding to a principal component score whose absolute value exceeds a threshold value from among the principal component scores in the column of the principal component score matrix $D_T$(n), which corresponds to the selected feature base (Op 604).

Figure 24A:
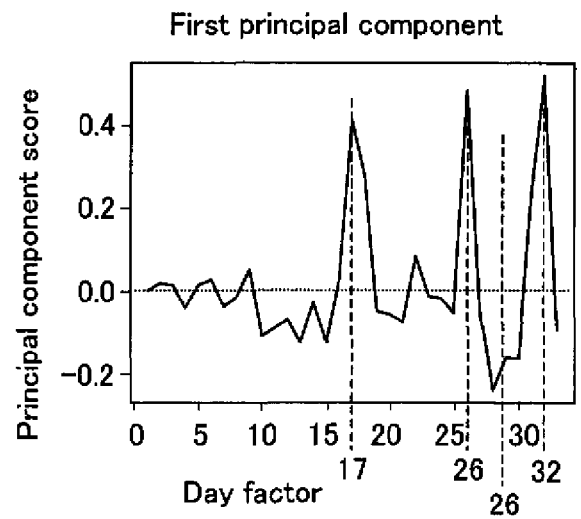
FIG. 24(a) is a diagram showing a graph in which principal component scores in a column of a first principal component of a principal component score matrix $D_T(n)$ are plotted.

FIG. 24(a) is a diagram showing an example of a graph in which principal component scores in a column of a first principal component (a feature base whose contribution rate is the highest) of the principal component score matrix $D_T$(n) are plotted on a two-dimensional coordinate plane. FIG.

Figure 24B:
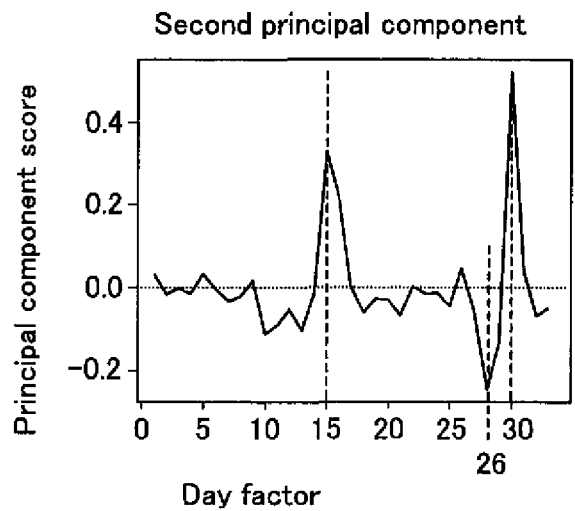
FIG. 24(b) is a diagram showing a graph in which principal component scores in a column of a second principal component are plotted.
Figure 24C:
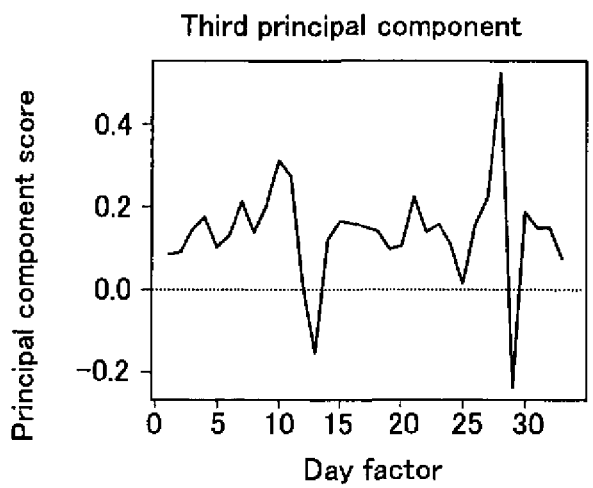
FIG. 24(c) is a diagram showing a graph in which principal component scores in a column of a third principal component are plotted.

24(*b*) is a diagram showing an example of a graph in which principal component scores in a column of a second principal component (a feature base whose contribution rate is the second highest) of the principal component score matrix $D_T$ (n) are plotted on a two-dimensional coordinate plane. FIG. 24(*c*) is a diagram showing an example of a graph in which principal component scores in a column of a third principal component (a feature base whose contribution rate is the third highest) of the principal component score matrix $D_T$ (n) are plotted on a two-dimensional coordinate plane. In each of the graphs shown in FIGS. 24(*a*) to 24(*c*), the vertical axis indicates a principal component score, and the horizontal axis indicates a day factor (the first day factor to the $33^{rd}$ day factor). In each of the graphs shown in FIGS. 24(*a*) to 24(*c*), regarding a certain principal component, a principal component score of one day factor shows how much of the property of the day factor is inherited in the principal component.

In the graph regarding the first principal component shown in FIG. 24(*a*), the $17^{th}$ day factor, the $26^{th}$ day factor and the $32^{nd}$ day factor exhibit high peaks of the principal component score. For example, in the case where the $17^{th}$ day factor, the $26^{th}$ day factor and the $32^{nd}$ day factor represent "August," a "summer" and a "late summer with lingering heat," respectively, it is indicated that the properties of these day factors, namely, August, a summer, and a late summer with lingering heat, are inherited to a high degree in the first principal component.

In the case where the time factor extracting portion 9 extracts a day factor corresponding to a principal component score whose absolute value exceeds a threshold value with respect to, for example, the first principal component shown in FIG. 24(*a*), for example, assuming that the threshold value is 0.3, the $17^{th}$ day factor, the $26^{th}$ day factor and the $32^{nd}$ day factor, namely, the day factors "August," "summer," and "late summer with lingering heat" are extracted.

The time factor extracting portion 9 adds "1" if the principal component score of the extracted day factor is positive, while adding "−1" if the principal component score is negative (Op 605). Then, the time factor extracting portion 9 determines a semantic distance of the day factor to which "−1" has been added among the extracted day factors, and eliminates the day factor whose said semantic distance is not less than a threshold value from the extracted day factors. For example, in the case where in the graph shown in FIG. 24(*b*), the $15^{th}$ day factor, the $26^{th}$ day factor and the $30^{th}$ day factor are extracted, "−1" is added to the $26^{th}$ day factor. The time factor extracting portion 9 determines a semantic distance of the $26^{th}$ day factor. The semantic distance is a value representing the degree of an influence of the property of a day factor on a principal component corresponding to the day factor. For example, the value of the semantic distance may be determined based on prerecorded rules, or may be determined by accepting an input of the value of the semantic distance from a user via a user interface.

Now, the following describes an example in which the time factor extracting portion 9 determines a semantic distance based on prerecorded rules. For example, in the case where the above-described $15^{th}$ day factor="Tuesday," the $26^{th}$ day factor="Friday," the $30^{th}$ day factor="Thursday," and the prerecorded rules are as follows, by the time factor extracting portion 9, a semantic distance between the $15^{th}$ day factor and the $26^{th}$ day factor can be determined to be at a relative distance grade "C" (=far).

(Rules)
Weekday="Tuesday, Wednesday, Thursday"
Weekend="Friday"
Relative distance grade between "weekday" and "weekend"=C
Herein, the relative distance grade is indicated as, for example, A=close, B=moderately close, or C=far.

The time factor extracting portion 9 combines the extracted day factors to generate a combined day factor (Op 607). For example, as shown in FIG. 24(*a*), in the case where regarding the first principal component, the day factors "August," "summer" and "late summer with lingering heat" are extracted, these day factors are combined so that a combined day factor "August & summer & late summer with lingering heat" is generated.

As described above, the time factor extracting portion 9 repeatedly performs the processings in Op 603 to Op 607 until the processings are completed with respect to each of all the columns (feature bases) of the principal component score matrix $D_T$ (n) (until "Yes" is given as a result of judgment in Op 608). Thus, a combined day factor is generated with respect to each of the feature bases included in the principal component score matrix $D_T$ (n).

The time factor extracting portion 9 calculates a principal component score of the combined day factor generated with respect to each of the feature bases, and generates a day factor matrix $D_A$ (n) configured by the principal component scores of the combined day factor (Op 609). Thus, the number of columns of the day factor matrix D (n), which used to be equal to the number of days included in a target time period, is compressed to the number of the feature bases, and the number of rows of the day factor matrix D (n) is compressed to the number of the combined day factors generated in the above-described processing in Op 607. In the calculation performed in Op 307, which is shown in FIG. 10, the day factor matrix $D_A$ (n) thus compressed is used as an explaining variable by the time factor feature generating portion 13. Thus, a computational load of the time factor feature generating portion 13 is reduced.

The processing in which the time factor extracting portion 9 compresses the day factor matrix D (n) is not limited to the processing shown in FIG. 23. For example, with the processings in Op 603 to Op 609 omitted, the principal component score matrix $D_T$ (n) generated in Op 602 may be transmitted to the time factor feature generating portion 13 as a compressed day factor matrix.

Furthermore, it is also possible that, using processing similar to the processing of compressing the day factor matrix D (n) shown in FIG. 23, day factors of a time factor mother group created by the time factor extracting portion 9 are compressed in Op 302 in FIG. 10.

Fifth Embodiment

This embodiment is an embodiment in which the time factor extracting portion 9 shown in the functional block diagram in FIG. 1 further has a function of calculating a correlation coefficient showing a correlation between the principal component score matrix T generated by the variation data generating portion 8 and a time factor value corresponding to at least one time factor among a plurality of time factors recorded in the time factor data recording portion 11, and extracting a time factor based on said correlation coefficient.

As a specific example, the following describes a case where when creating a time factor mother group in Op 302 shown in FIG. 10, the time factor extracting portion 9 calculates a correlation coefficient showing a correlation between the principal component score matrix T generated by the variation data generating portion 8 and each of time factor values corresponding respectively to a plurality of time factors recorded in the time factor data recording portion 11, and extracts a time factor to be added to the time factor mother group based on said correlation coefficient.

Figure 25:
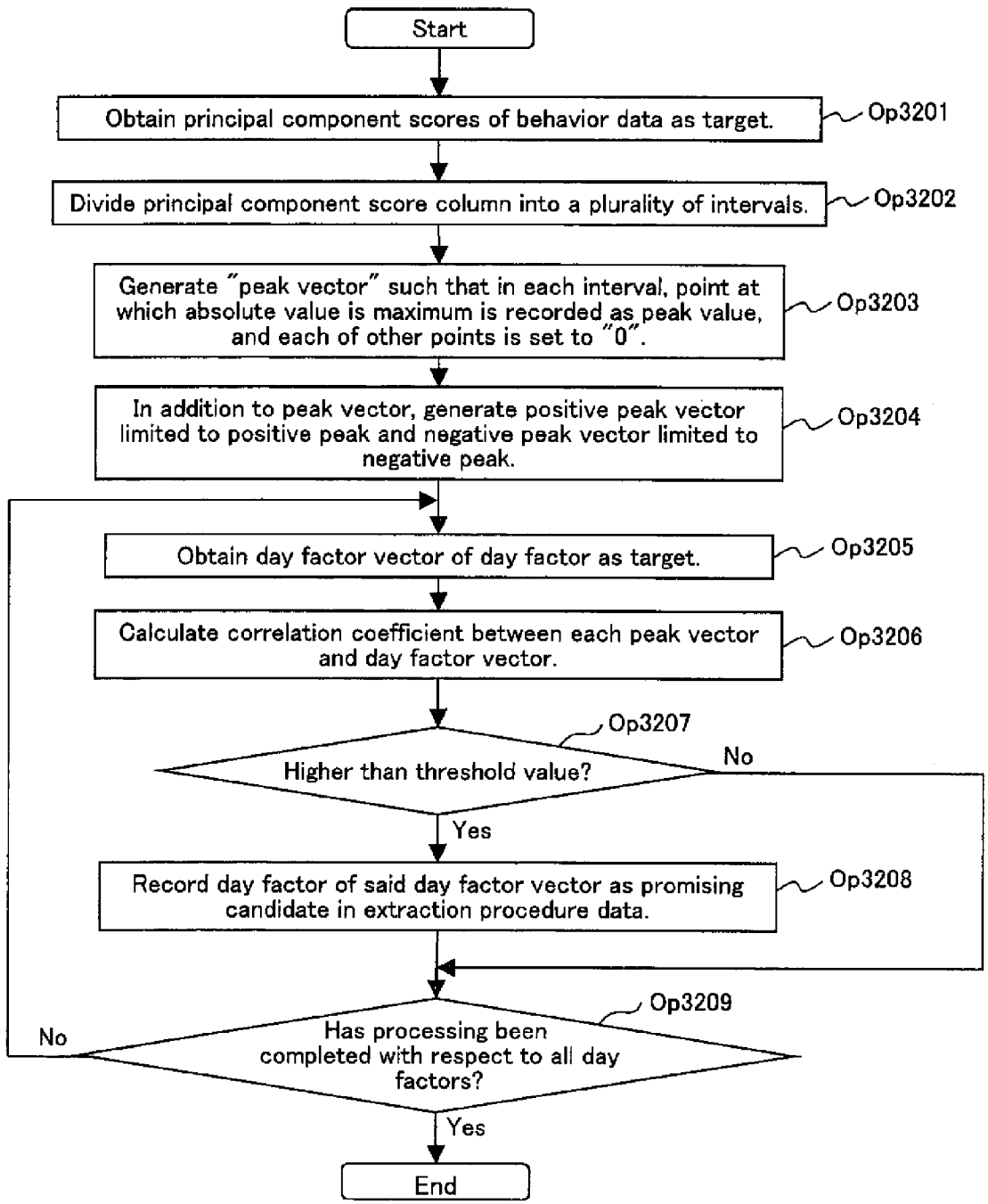
FIG. 25 is a flow chart showing an example of processing in a fifth embodiment, in which the time factor extracting portion extracts a time factor to be added to a time factor mother group.

FIG. 25 is a flow chart showing an example of processing in this embodiment, in which the time factor extracting portion 9 extracts a time factor to be added to a time factor mother group. As shown in FIG. 25, the time factor extracting portion 9 obtains the principal component score matrix T generated by the variation data generating portion 8 (Op 3201). For example, as described with regard to the first embodiment, the principal component score matrix T is calculated by the processing shown in FIG. 9. The principal component score matrix T is a N×p matrix configured by N rows corresponding to the number of days (N days) and p columns corresponding to the first principal component to the $p^{th}$ principal component.

Figure 26A:
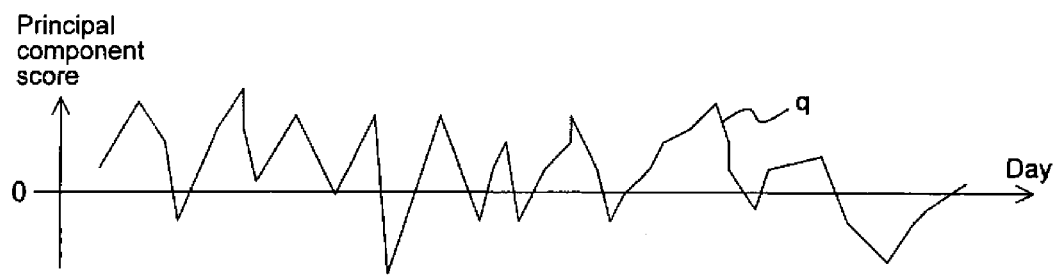
FIG. 26(a) is a diagram showing a graph of principal component scores in a principal component score matrix.
Figure 26B:
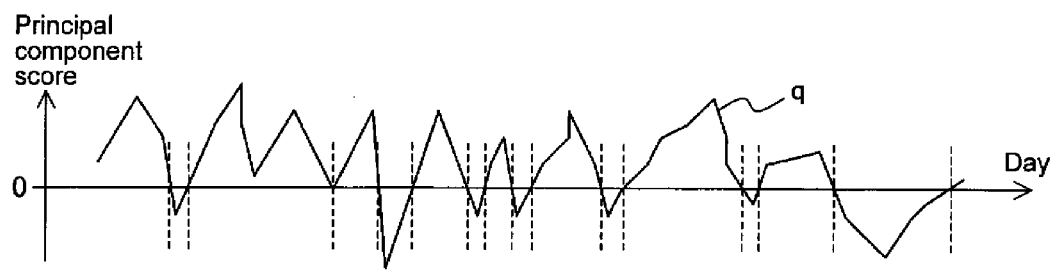
FIG. 26(b) is a diagram showing an example of a case where a kinked line q shown in FIG. 26(a) is divided into a plurality of intervals.
Figure 26C:
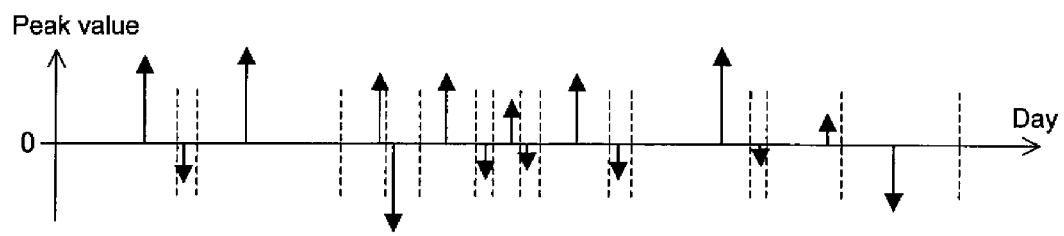
FIG. 26(c) is a diagram showing a peak value in each of the intervals shown in FIG. 26(b).

The time factor extracting portion 9 divides elements in a column corresponding to one principal component (for example, a first principal component) in a principal component score matrix into a plurality of intervals (Op 3202). For example, the time factor extracting portion 9 can divide the elements into a plurality of intervals at points at which principal component scores change sign. FIG. 26(*a*) is a diagram showing an example of a graph in which principal component scores corresponding to one principal component in a principal component score matrix are plotted on a two-dimensional coordinate plane. In FIG. 26(*a*), the vertical axis indicates a principal component score, and the horizontal axis indicates a day. A kinked line q is a line connecting principal component scores of the days.

Herein, as an example, a case is described in which elements in a column corresponding to one principal component (for example, a first principal component) in a principal component score matrix are used as targets of processing. However, targets of processing is not limited thereto. For example, it is also possible to use as targets of processing, elements in columns corresponding respectively to all principal components in a principal component score matrix.

FIG. 26(*b*) is a diagram showing an example of a case where the time factor extracting portion 9 divides the kinked line q into a plurality of intervals in the horizontal axis direction at intersection points between the kinked line q and a line where a principal component score=0, which are shown in FIG. 26(*a*). In FIG. 26(*a*), a dotted line indicates a boundary between the intervals.

With respect to each of the intervals, the time factor extracting portion 9 generates a peak vector such that an element of a day corresponding to a principal component score whose absolute value becomes the maximum is used as a principal component score value of the each of the intervals (hereinafter, referred to as a peak value), and each of elements of the other days is set to "0" (Op 3203). FIG. 26(*c*) is a diagram that shows, using an arrow, a peak value in each of the intervals shown in FIG. 26(*b*). Herein, it is also possible to modify a peak vector so that a peak value whose absolute value is lower than a threshold value among peak values included in the peak vector is set to "0". Thus, a small peak value is ignored, and therefore, it may become easier to detect a correlation by a calculation of a correlation coefficient, which will be described later.

The time factor extracting portion 9 further generates a positive peak vector in a manner that in a peak vector, a negative peak value is set to "0" and a positive peak value is retained, and a negative peak vector in a manner that in a peak vector, a positive peak value is set to "0" and a negative peak value is retained (Op 3204).

Then, the time factor extracting portion 9 selects one day factor as a target of processing from the time factor data recording portion 11, and obtains a day factor vector including day factor values of the day factor as elements (Op 3205). The time factor extracting portion 9 calculates a correlation coefficient between the day factor vector and the peak vector (Op 3206). For example, the time factor extracting portion 9 can determine as a correlation coefficient, a value obtained by dividing an inner product of the day factor vector and the peak vector by a product of a magnitude of the day factor vector and a magnitude of the peak vector (namely, cos θ). In a similar manner, the time factor extracting portion 9 also calculates a correlation coefficient between the day factor vector and the positive peak vector and a correlation coefficient between the day factor vector and the negative peak vector. These correlation coefficients are values showing a correlation with the principal component score matrix T representing variations in degree of use of a Web site.

The time factor extracting portion 9 can extract a day factor having a high correlation with the principal component score matrix T by comparing each of the above three correlation coefficients with a threshold value. For example, in the case where at least one of the above three correlation coefficients is higher than the threshold value ("Yes" in Op 3207), this day factor is recorded as a promising candidate in, for example, extraction procedure data for creating a time factor mother group such as the mother group extraction condition table 25 shown in FIG. 11 (Op 3208).

The time factor extracting portion 9 repeatedly performs the above-described processings in Op 3205 to Op 3208 until, for example, the processings are completed with respect to all day factors recorded in the time factor data recording portion 11 (until "Yes" is given as a result of judgment in Op 3209). Thus, from the day factors recorded in the time factor data recording portion 11, a day factor that has a high correlation with the principal component score matrix T and is promising as an explaining variable is added to a time factor mother group.

The processing in which the time factor extracting portion 9 extracts a time factor candidate using a correlation between variation data and time factor values is not limited to the processing shown in FIG. 25. Further, using processing similar to the processing of extracting a time factor candidate shown in FIG. 25, the time factor extracting portion 9 may extract a combination of day factors to be recorded on an extraction list in, for example, Op 303 in FIG. 10.

The above-described first to fifth embodiments are specific examples of the case where the present invention is implemented, and the present invention is not limited thereto. For example, data showing time factor generated in the time factor feature generation system 1 can also be used widely as a forecast model to be used to forecast variations in degree of use of a Web site, as well as in the above-described processing by each of the advertisement inserting portion 19 and the user analyzing portion 16. Further, a site as a target of time factor feature analysis by the time factor feature generation system 1 is not limited to a Web site and can also be, for example, a site on a network in a limited area such as a LAN.

The present invention can be used as a time factor feature generation system that can generate data quantitatively showing a time factor feature of a use status of a site.

The invention may be embodied in other forms without departing from the spirit or essential features thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A time species characteristic generation system being constructed on a computer that includes at least one processor, comprising:

a use status grasping portion that extracts, from log data showing a use status of at least one site that is provided by a computer connected to a network, transition data showing variations in degree of use of the site in a predetermined time period;

a variation data generating portion that generates, based on the transition data, variation data expressing the variations in degree of use of the site in the predetermined time period as a group Y of values showing the degree of use of the site;

a time species data recording portion in which data showing a plurality of time species and a time species factor value representing a time period specified by each of the plurality of time species are recorded;

a time species factor extracting portion that extracts a time species in accordance with a prerecorded procedure from among the plurality of time species recorded in the time species data recording portion and generates i groups $D_i$ of time species factor values, each of which represents a period that is specified by each of the extracted time species and is in the predetermined time period; and a time species characteristic generating portion that calculates, using the processor, i coefficients $a_i$ such that a square of an error b has a minimum value in an equation below (Mathematical Equation 1) in which the group Y showing the degree of use of the site in the predetermined time period are expressed by the groups $D_i$ of time species factor values and generates data including the coefficients $a_i$ and the time species corresponding to the groups $D_i$, as data showing a time species characteristic of a use status of the site $$Y = \sum_i a_i D_i + b.$$ [Mathematical Equation 1]

2. The time factor feature generation system according to claim 1, wherein the use status grasping portion extracts transition data representing variations in degree of use of a service provided by the site.

3. The time factor feature generation system according to claim 1, wherein the use status grasping portion extracts transition data representing variations in amount of an access to an advertisement provided by the site.

4. The time factor feature generation system according to claim 1, wherein the use status grasping portion extracts transition data representing variations in number of occurrences of a behavior to access a particular advertisement provided by at least one site and use a service regarding the particular advertisement, which is provided by the site or another site.

5. The time factor feature generation system according to claim 1, wherein the time factor data recording portion records, with respect to each of the plurality of time factors, a time factor value that is a value representing at least one day specified by a corresponding time factor, among a plurality of days into which a continuous length of time is separated in a unit of day.

6. The time factor feature generation system according to claim 1, wherein the time factor data recording portion records, with respect to each of the plurality of time factors, a time factor value that is a value representing a time frame specified by one time factor, among a plurality of time frames into which a continuous length of time is separated in a unit of hour or minute.

7. The time factor feature generation system according to claim 1, further comprising:

a user time factor feature recording portion that records data showing an attribute of a user and data showing a time factor feature of a status of use by a user having the attribute, correspondingly to each other; and a user analyzing portion that compares the data showing the time factor feature generated by the time factor feature generating portion with the data showing the time factor feature recorded in the user time factor feature recording portion thereby to specify an attribute of a user using the site.

8. The time factor feature generation system according to claim 1, wherein the time factor extracting portion extracts a plurality of combinations of time factors from among the plurality of time factors recorded in the time factor data recording portion and generates a plurality of groups $D_i$ of time factor values, which correspond respectively to the combinations, and the time factor feature generating portion calculates the coefficient $a_i$ with respect to each of the plurality of groups $D_i$ of time factor values thereby to generate a plurality of pairs, each of which is composed of the coefficient $a_i$ and each of the groups $D_i$ of time factor values, selects a pair from among the plurality of pairs based on a predetermined standard, and generates data including the coefficient $a_i$ of the selected pair and time factors corresponding to the group $D_i$ of time factor values of the selected pair as data showing a time factor feature of a use status of the site.

9. The time factor feature generation system according to claim 1, wherein the variation data generating portion expresses the variations in degree of use, which are shown by the transition data, as multi-variate data showing a degree of use, performs principal component analysis with respect to the multi-variate data thereby to extract a feature base, and obtain a group Y of principal component scores of the feature base, and the time factor extracting portion generates multi-variate data showing time factor values corresponding to the time factor extracted from among the plurality of time factors recorded in the time factor data recording portion, performs principal component analysis with respect to the multi-variate data thereby to extract a feature base, and obtain a group $D_i$ of principal component scores of the feature base.

10. The time factor feature generation system according to claim 1, wherein the variation data generating portion expresses the variations in degree of use, which are shown by the transition data, as muti-variate data showing a degree of use, performs principal component analysis with respect to the multi-variate data thereby to extract feature bases, further extracts a feature interval in which one of the extracted feature bases deviates by a predetermined amount or more from the other feature bases, and obtain a group Y of principal component scores of the one of the extracted feature bases in the feature interval, and the time factor extracting portion generates a group of time factor values included in the feature interval as the group $D_i$.

11. The time factor feature generation system according to claim 1, wherein the variation data generating portion expresses the variations in degree of use, which are shown by the transition data, as multi-variate data showing a degree of use, performs principal component analysis with respect to the multi-variate data thereby to extract a plurality of feature bases, and generates a group Y of principal component scores of each of the plurality of extracted feature bases, the time factor extracting portion generates the group $D_i$ with respect to each of the plurality of feature bases, and the time factor feature generating portion calculates a coefficient $a_i$ with respect to the group Y corresponding to the each of the plurality of feature bases using the group $D_i$ corresponding to the each of the plurality of feature bases and merges the groups $D_i$ and the coefficients $a_i$ of the plurality of feature bases thereby to generate data showing a time factor feature of a use status of the site.

12. The time factor feature generation system according to claim 1, wherein the variation data generating portion expresses the variations in degree of use, which are shown by the transition data, as multi-variate data showing a degree of use, performs principal component analysis with respect to the multi-variate data thereby to extract a feature base, and obtain a group Y of principal component scores of the feature base, and the time factor extracting portion calculates a correlation coefficient showing a correlation between the principal component scores of the feature base extracted by the variation data generating portion and time factor values corresponding to at least one of the plurality of time factors recorded in the time factor data recording portion and extracts a time factor based on the correlation coefficient.

13. A time factor feature generation method executed by a computer that includes at least one processor, comprising operations of:

extracting, from log data showing a use status of at least one site that is provided by a computer connected to a network, transition data showing variations in degree of use of the site in a predetermined time period;

generating, based on the transition data, variation data expressing the variations in degree of use of the site in the predetermined time period as a group Y of values showing the degree of use of the site;

extracting a time factor in accordance with a predetermined procedure, from among a plurality of time factors recorded in a time factor data recording portion in which data showing the plurality of time factors and a time factor value representing a time period specified by each of the plurality of time factors are recorded, and generating i groups $D_i$ of time factor values, each of which represents a period that is specified by each of the extracted time factors and is in the predetermined time period; and calculating, using the processor, i coefficients $a_i$ such that a square of an error b has a minimum value in an equation below (Mathematical Equation 1) in which the group Y showing the degree of use of the site in the predetermined time period are expressed by the group $D_i$ of time factor values and generates data including the coefficients $a_i$ and the time factors corresponding to the groups $D_i$ as data showing a time factor feature of a use status of the site $$Y = \sum_i a_i D_i + b. \quad \text{[Mathematical Equation 1]}$$

14. A computer readable recording medium storing a time factor feature generation program that makes a computer execute processings of:

extracting, from log data showing a use status of at least one site that is provided by a computer connected to a network, transition data showing variations in degree of use of the site in a predetermined time period;

generating, based on the transition data, variation data expressing the variations in degree of use of the site in the predetermined time period as a group Y of values showing the degree of use of the site;

extracting a time factor in accordance with a predetermined procedure, from among a plurality of time factors recorded in a time factor data recording portion in which data showing the plurality of time factors and a time factor value representing a time period specified by each of the plurality of time factors are recorded, and generating i groups $D_i$ of time factor values, each of which represents a period that is specified by each of the extracted time factors and is in the predetermined period; and calculating i coefficients $a_i$ such that a square of an error b has a minimum value in an equation below (Mathematical Equation 1) in which the group Y showing the degree of use of the site in the predetermined time period are expressed by the group $D_i$ of time factor values and generates data including the coefficients $a_i$ and the time factors corresponding to the groups $D_i$ as data showing a time factor feature of a use status of the site $$Y = \sum_i a_i D_i + b. \quad \text{[Mathematical Equation 1]}$$

* * * * *